(12) United States Patent
Sung et al.

(10) Patent No.: US 11,471,863 B2
(45) Date of Patent: Oct. 18, 2022

(54) CATALYTIC ARTICLES

(71) Applicant: BASF Corporation, Florham Park, NJ (US)

(72) Inventors: Shiang Sung, New York, NY (US); Markus Koegel, Roemerberg (DE); Bjoern Neumann, Hamburg (DE); Patrick McCanty, Caldwell, NJ (US)

(73) Assignee: BASF CORPORATION, Florham Park, NJ (US)

( * ) Notice: Subject to any disclaimer, the term of this patent is extended or adjusted under 35 U.S.C. 154(b) by 285 days.

(21) Appl. No.: 16/484,394

(22) PCT Filed: Feb. 7, 2018

(86) PCT No.: PCT/IB2018/050766
§ 371 (c)(1),
(2) Date: Aug. 7, 2019

(87) PCT Pub. No.: WO2018/146603
PCT Pub. Date: Aug. 16, 2018

(65) Prior Publication Data
US 2020/0384449 A1 Dec. 10, 2020

Related U.S. Application Data

(60) Provisional application No. 62/456,190, filed on Feb. 8, 2017.

(51) Int. Cl.
| | | |
|---|---|---|
| *F01N 3/20* | (2006.01) | |
| *B01J 29/44* | (2006.01) | |
| *B01J 29/74* | (2006.01) | |
| *B01J 29/76* | (2006.01) | |
| *F01N 3/022* | (2006.01) | |
| *F01N 3/08* | (2006.01) | |

(Continued)

(52) U.S. Cl.
CPC .............. *B01J 29/44* (2013.01); *B01D 53/56* (2013.01); *B01D 53/565* (2013.01); *B01D 53/62* (2013.01); *B01D 53/72* (2013.01); *B01D 53/864* (2013.01); *B01D 53/865* (2013.01); *B01D 53/8628* (2013.01); *B01D 53/8631* (2013.01);

(Continued)

(58) Field of Classification Search
CPC .. Y02T 10/12; B01J 23/10; B01J 29/44; B01J 29/74; B01J 29/42; B01J 29/405; B01J 29/46; B01J 29/48; B01J 29/52; B01J 29/505; B01J 29/54; B01J 29/56; B01J 29/58; B01J 29/61; B01J 29/655; B01J 29/66; B01J 29/67; B01J 29/68; B01J 29/78; B01J 29/743; B01J 29/763; B01J 29/76; B01J 29/723; B01J 29/7215; B01J 29/7415; B01J 29/7615; B01J 29/7815; B01J 29/783; B01J 29/7049; B01J 29/7057; B01J 29/7065; B01J 29/061; B01J 29/068; B01J 29/072; B01J 29/076; B01J 35/04; B01J 37/04; B01J 37/0244; B01J 37/0246; F01N 3/021; F01N 3/2066; F01N 3/106; F01N 3/022; F01N 3/0222; F01N 3/2828; F01N 3/20; F01N 3/0842; F01N 2330/06; F01N 2330/30; F01N 2370/04; F01N 2570/14; F01N 2570/145; F01N 2570/18; F01N 2510/063; F01N 2510/068; F01N 2510/0864; F01N 3/18; F01N 3/101; F01N 2510/0684; B01D 53/56; B01D 53/565; B01D 53/62; B01D 53/72; B01D 53/8628; B01D 53/8631; B01D 53/864; B01D 53/8643; B01D 53/8646; B01D 53/865; B01D 53/8653; B01D 53/8656; B01D 53/8668; B01D 53/90; B01D 53/94; B01D 53/922; B01D 53/925; B01D 53/927; B01D 53/9459; B01D 53/9468; B01D 53/9472; B01D 53/9477; B01D 53/9418; B01D 53/944; B01D 53/9445; B01D 53/945; B01D 53/9454
USPC ........ 502/60, 64, 65, 66, 67, 69, 71, 73, 74, 502/77, 527.12, 527.13, 527.19; 422/177, 422/180; 423/212, 213.2, 213.5, 213.7, 423/235, 239.1, 239.2, 245.1, 246, 247, 423/248
See application file for complete search history.

(56) References Cited

U.S. PATENT DOCUMENTS

| | | | |
|---|---|---|---|
| 3,030,181 | A | 4/1962 | Milton et al. |
| 4,440,871 | A | 4/1984 | Lok et al. |

(Continued)

FOREIGN PATENT DOCUMENTS

| | | |
|---|---|---|
| CN | 102369058 A | 3/2012 |
| CN | 102387856 A | 3/2012 |

(Continued)

OTHER PUBLICATIONS

Office Action from Japanese Patent Office in counterpart JP 2019-543086, dated Dec. 14, 2021.

(Continued)

*Primary Examiner* — Elizabeth D Wood
(74) *Attorney, Agent, or Firm* — Finnegan, Henderson, Farabow, Garrett & Dunner LLP

(57) ABSTRACT

Provided herein is a catalytic article including a catalytic coating disposed on a substrate, wherein the catalytic coating comprises a bottom coating on the substrate and a top coating layer on the bottom coating layer, one such coating layer containing a platinum group metal on a refractory metal oxide support and the other such coating layer containing a ceria-containing molecular sieve. Such catalytic articles are effective toward treating exhaust gas streams of internal combustion engines and exhibit outstanding resistance to sulfur.

32 Claims, 12 Drawing Sheets

(51) Int. Cl.
| | |
|---|---|
| B01J 23/10 | (2006.01) |
| B01J 29/068 | (2006.01) |
| B01J 29/076 | (2006.01) |
| B01J 29/072 | (2006.01) |
| B01J 29/78 | (2006.01) |
| B01J 29/06 | (2006.01) |
| B01J 29/46 | (2006.01) |
| B01J 29/56 | (2006.01) |
| B01J 29/40 | (2006.01) |
| B01J 29/48 | (2006.01) |
| B01J 29/50 | (2006.01) |
| B01J 29/42 | (2006.01) |
| B01J 29/52 | (2006.01) |
| B01J 29/54 | (2006.01) |
| B01J 29/65 | (2006.01) |
| B01J 29/58 | (2006.01) |
| B01J 29/70 | (2006.01) |
| B01J 29/68 | (2006.01) |
| B01J 29/67 | (2006.01) |
| B01J 29/66 | (2006.01) |
| B01J 29/61 | (2006.01) |
| B01J 35/04 | (2006.01) |
| B01J 29/72 | (2006.01) |
| B01D 53/62 | (2006.01) |
| B01D 53/56 | (2006.01) |
| B01D 53/72 | (2006.01) |
| B01D 53/86 | (2006.01) |
| B01D 53/90 | (2006.01) |
| B01D 53/92 | (2006.01) |
| B01D 53/94 | (2006.01) |
| F01N 3/28 | (2006.01) |

(52) U.S. Cl.
CPC ..... *B01D 53/8643* (2013.01); *B01D 53/8646* (2013.01); *B01D 53/8653* (2013.01); *B01D 53/8656* (2013.01); *B01D 53/8668* (2013.01); *B01D 53/90* (2013.01); *B01D 53/922* (2013.01); *B01D 53/94* (2013.01); *B01D 53/945* (2013.01); *B01D 53/9445* (2013.01); *B01D 53/9454* (2013.01); *B01J 23/10* (2013.01); *B01J 29/061* (2013.01); *B01J 29/068* (2013.01); *B01J 29/072* (2013.01); *B01J 29/076* (2013.01); *B01J 29/405* (2013.01); *B01J 29/42* (2013.01); *B01J 29/46* (2013.01); *B01J 29/48* (2013.01); *B01J 29/505* (2013.01); *B01J 29/52* (2013.01); *B01J 29/54* (2013.01); *B01J 29/56* (2013.01); *B01J 29/58* (2013.01); *B01J 29/61* (2013.01); *B01J 29/655* (2013.01); *B01J 29/66* (2013.01); *B01J 29/67* (2013.01); *B01J 29/68* (2013.01); *B01J 29/7049* (2013.01); *B01J 29/7057* (2013.01); *B01J 29/7065* (2013.01); *B01J 29/723* (2013.01); *B01J 29/7215* (2013.01); *B01J 29/74* (2013.01); *B01J 29/743* (2013.01); *B01J 29/7415* (2013.01); *B01J 29/76* (2013.01); *B01J 29/763* (2013.01); *B01J 29/7615* (2013.01); *B01J 29/78* (2013.01); *B01J 29/783* (2013.01); *B01J 29/7815* (2013.01); *B01J 35/04* (2013.01); *F01N 3/0222* (2013.01); *F01N 3/0842* (2013.01); *F01N 3/2066* (2013.01); *F01N 3/2828* (2013.01); *F01N 2370/04* (2013.01); *F01N 2510/063* (2013.01); *F01N 2510/0684* (2013.01)

(56) References Cited

U.S. PATENT DOCUMENTS

| | | | |
|---|---|---|---|
| 4,544,538 | A | 10/1985 | Zones |
| 6,162,415 | A | 12/2000 | Liu et al. |
| 6,171,556 | B1 | 1/2001 | Burk et al. |
| 6,709,644 | B2 | 3/2004 | Zones et al. |
| 7,229,597 | B2 | 6/2007 | Patchett et al. |
| 7,264,789 | B1 | 9/2007 | Verduijn et al. |
| 8,404,203 | B2 | 3/2013 | Bull et al. |
| 9,321,042 | B2 | 4/2016 | Hoke et al. |
| 2010/0180582 | A1 | 7/2010 | Mueller-Stach et al. |
| 2012/0117953 | A1 | 5/2012 | Andersen et al. |
| 2012/0308439 | A1 | 12/2012 | Chen et al. |
| 2013/0216441 | A1 | 8/2013 | Johansen et al. |
| 2015/0165422 | A1 | 6/2015 | Sung et al. |
| 2015/0265969 | A1* | 9/2015 | Fedeyko ............... F01N 3/2066 423/213.2 |
| 2015/0321184 | A1 | 11/2015 | Fedeyko et al. |
| 2016/0136626 | A1 | 5/2016 | Phillips et al. |

FOREIGN PATENT DOCUMENTS

| | | |
|---|---|---|
| CN | 103974759 A | 8/2014 |
| CN | 103987444 A | 8/2014 |
| CN | 105682792 A | 6/2016 |
| GB | 868846 | 5/1961 |
| JP | H07-323215 A | 12/1995 |
| JP | 2012-515086 A | 7/2012 |
| JP | 2012-152744 A | 8/2012 |
| JP | 2012-523313 A | 10/2012 |
| JP | 2013-517934 A | 5/2013 |
| JP | 2014-519975 A | 8/2014 |
| WO | 2010/083315 A2 | 7/2010 |
| WO | 2010/118125 A2 | 10/2010 |
| WO | 2011/092517 A1 | 8/2011 |
| WO | 2013/088128 A1 | 6/2013 |
| WO | 2013/088133 A1 | 6/2013 |
| WO | WO 2015/031611 | 3/2015 |
| WO | 2015/066312 A1 | 5/2015 |
| WO | WO 2016/070090 | 5/2016 |
| WO | WO 2016/127012 | 8/2016 |

OTHER PUBLICATIONS

Office Action in counterpart Chinese Patent Application No. 201880023023.0, dated Dec. 24, 2021 (13 pages).

* cited by examiner

CATALYTIC ARTICLES

CROSS-REFERENCE TO RELATED APPLICATIONS

The present application is a U.S. National Stage of International Patent Application PCT/PCT/IB2018/050766, filed Feb. 7, 2018, and claims priority to U.S. Provisional Patent Application No. 62/456,190, filed Feb. 8, 2017. The disclosures of each of the applications noted above are incorporated herein by reference in their entirety.

The present invention is directed to catalytic articles, systems and methods for treating exhaust gas streams of an internal combustion engine, as well as to methods of making the same.

BACKGROUND OF THE INVENTION

Exhaust gas streams of internal combustion engines contain pollutants such as hydrocarbons (HC), carbon monoxide (CO) and nitrogen oxides (NOx) that foul the air.

Oxidation catalysts comprising a precious metal, such as platinum group metals (PGMs), dispersed on a refractory metal oxide support, such as alumina, are used in treating the exhaust of internal combustion engines in order to convert both hydrocarbon and carbon monoxide gaseous pollutants by catalyzing the oxidation of these pollutants to carbon dioxide and water. Typically, the oxidation catalysts are formed on ceramic or metallic substrates upon which one or more catalyst coating compositions are deposited. In addition to the conversion of gaseous HC and CO emissions, oxidation catalysts that contain PGM promote the oxidation of NO to $NO_2$. Catalysts are typically defined by their light-off temperature or the temperature at which 50% conversion is attained, also called $T_{50}$.

PGM catalysts are subject to poisoning by sulfur. Catalytic articles may be regenerated at high temperatures to remove sulfur compounds. This regeneration is commonly accomplished during the period of the soot filter regeneration by an injection of additional hydrocarbons, which can be derived from either fuel or from the engine, onto the diesel oxidation catalysts to create an exotherm needed to burn off soot/particulate on the filter. However, these regeneration processes may themselves do harm to the catalyst.

There exists a need for still more efficient catalysts for the treatment of exhaust gases of internal combustion engines. A specific need includes a catalyst that provides excellent conversion of CO and NOx and that is stable to repeated high temperature desulfation processes.

SUMMARY OF THE INVENTION

Disclosed is a catalytic article comprising a molecular sieve containing palladium and ceria. The catalyst composition of the invention exhibits outstanding sulfur resistance. Also disclosed is a catalytic article comprising a catalytic coating disposed over a substrate, where the catalytic coating comprises one or more coating layers, wherein at least one coating layer is a catalytic coating layer comprising the catalyst composition comprising a molecular sieve containing palladium and ceria. Also disclosed is an exhaust gas treatment system comprising the catalytic article downstream of and in fluid communication with an internal combustion engine; as well as a method for treating an exhaust gas stream comprising hydrocarbons and/or carbon monoxide and/or NOx, the method comprising passing the exhaust stream through a catalytic article or system as described herein.

Accordingly, disclosed is a catalytic article comprising a catalytic coating disposed over a substrate, wherein the catalytic coating comprises a bottom coating layer on the substrate and a top coating layer on the bottom coating layer, wherein, e.g., the bottom coating layer comprises a ceria-containing molecular sieve and the top coating layer comprises a platinum group metal on a refractory metal oxide support or wherein the bottom coating layer comprises a platinum group metal on a refractory metal oxide support and the top coating layer comprises a ceria-containing molecular sieve. Also disclosed is an exhaust gas treatment system comprising the present catalytic article. Also disclosed is a method of treating an exhaust gas stream of an internal combustion engine, the method comprising passing the gas stream through the catalytic article or exhaust gas treatment system. The disclosed catalytic articles exhibit outstanding sulfur resistance.

In one aspect of the present disclosure is provided a catalytic article comprising a catalytic coating disposed on a substrate, wherein the catalytic coating comprises a bottom coating layer on the substrate and a top coating layer on the bottom coating layer, wherein: the bottom coating layer comprises a ceria—("free cerium")—containing molecular sieve, and the top coating layer comprises a platinum group metal on a refractory metal oxide support; or the bottom coating layer comprises a platinum group metal on a refractory metal oxide support, and the top coating layer comprises a ceria-containing molecular sieve.

In some embodiments, the ceria-containing molecular sieve comprises a small pore molecular sieve. Exemplary small pore molecular sieves in some embodiments include, but are not limited to, small pore molecular sieve with a framework type selected from the group consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, ZON, and mixtures or intergrowths thereof. In certain embodiments, the ceria-containing molecular sieve comprises a molecular sieve with a framework type selected from the group consisting of CHA, LEV, AEI, AFX, ERI, SFW, KFI, DDR, ITE, and mixtures or intergrowths thereof. For example, in certain specific embodiments, the ceria-containing molecular sieve is CeCHA.

In some embodiment, the ceria-containing molecular sieve comprises a medium pore molecular sieve. Exemplary medium pore molecular sieves in some embodiments include, but are not limited to, medium pore molecular sieves with a framework type selected from the group consisting of AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, PAR, PCR, PON, PUN, RRO, RSN, SFF, SFG, STF, STI, STT, STW, SVR, SZR, TER, TON, TUN, UOS, VSV, WEI, WEN and mixtures or intergrowths thereof. In certain embodiments, the ceria-containing molecular sieve comprises a molecular sieve with a framework type selected from the group consisting of FER, MEL, MFI, STT, and mixtures or intergrowths thereof. For example, in certain specific embodiments, the ceria-containing molecular sieve comprises a ZSM-5 molecular sieve The ceria content can vary. In some embodiments, the ceria in the ceria-containing molecular sieve is present from about 1% to about 50% by weight, based on a total weight of the ceria-containing molecular sieve. In some embodiments, the ceria-containing molecular sieve is present in a loading of from about 0.05 g/in$^3$ to about 5.0 g/in$^3$, based on a total volume of the substrate.

The disclosed articles can comprise additional components. The article, in some embodiments, further comprises a hydrocarbon adsorption molecular sieve. For example, in some embodiments, the bottom layer further comprises a hydrocarbon adsorption molecular sieve. In some embodiments, the ceria-containing molecular sieve further comprises one or more catalytically active metals selected from the group consisting of copper, iron, manganese, magnesium, cobalt, nickel, platinum, palladium, and rhodium. Such one or more catalytically active metals are present, in particular embodiments, in a loading of about 3 g/ft$^3$ to about 100 g/ft$^3$, based on a total volume of the substrate.

The refractory metal oxide support, in some embodiments, comprises alumina, titania, zirconia; a mixture of alumina with one or more of titania, zirconia and ceria; ceria coated on alumina; titania coated on alumina; silica-alumina; aluminosilicates; alumina-zirconia; alumina-chromia; or alumina-ceria. In some embodiments, the platinum group metal is present in a loading of about 2 g/ft$^3$ to about 200 g/ft$^3$, based on a total volume of the substrate.

The substrate can vary. In some embodiments, the substrate is a porous wall-flow filter and in some embodiments, the substrate is a flow-through monolith.

The assembly of the layers on the substrate can also vary. For example, in some embodiments, the bottom coating layer is in direct contact with the substrate. In some embodiments, the top coating layer is in direct contact with the bottom coating layer. In some embodiments, the catalytic coating comprises an undercoat layer. In some embodiments, the catalytic coating comprises an overcoat layer. In some embodiments, the catalytic coating comprises an interlayer between the top and bottom coating layers. The catalytic coating, in certain embodiments, comprises an undercoat layer, an overcoat layer or an interlayer, where one or more of said layers are substantially free of platinum group metal components.

The top coating layer, in some embodiments, overlays the entire bottom coating layer. The bottom coating layer, in some embodiments, extends the entire axial length of the substrate. The top coating layer, in some embodiments, extends the entire axial length of the substrate. In some embodiments, the bottom coating layer extends from about 10% to about 95% of the axial length of the substrate, from either an inlet or outlet end. In some embodiments, the top coating layer extends from about 10% to about 95% of the axial length of the substrate, from either an inlet or outlet end. In some embodiments, the catalytic coating is present at a loading of about 0.3 g/in$^3$ to about 7 g/in$^3$, based on a total volume of the substrate.

In another aspect of the disclosure is provided an exhaust gas treatment system comprising the catalytic article disclosed herein, positioned downstream of and in fluid communication with an internal combustion engine. The exhaust gas treatment system may comprise any number of additional components. For example, in some embodiments, the system further comprises a catalytic article selected from the group consisting of a urea injector, a selective catalytic reduction catalyst, a diesel oxidation catalyst, a soot filter, an ammonia oxidation catalyst, and a lean NOx trap. The disclosure further provides a method for treating an exhaust gas stream comprising hydrocarbons and/or carbon monoxide and/or NOx, the method comprising passing the exhaust stream through a catalytic article or system as disclosed herein.

The present disclosure includes, without limitation, the following embodiments.

Embodiment 1

A catalytic article comprising a catalytic coating disposed on a substrate, wherein the catalytic coating comprises a bottom coating layer on the substrate and a top coating layer over the bottom coating layer, wherein the bottom coating layer comprises a ceria-containing molecular sieve, and the top coating layer comprises a platinum group metal on a refractory metal oxide support; or the bottom coating layer comprises a platinum group metal on a refractory metal oxide support, and the top coating layer comprises a ceria-containing molecular sieve.

Embodiment 2

The catalytic article of the preceding embodiment, wherein the molecular sieve of the ceria-containing molecular sieve is a small pore molecular sieve; for example, small pore molecular sieve selected from the group consisting of framework types ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, ZON and mixtures or intergrowths thereof; for instance, selected from the group of framework types CHA, LEV, AEI, AFX, ERI, SFW, KFI, DDR and ITE.

Embodiment 3

The catalytic article of any preceding embodiment, wherein the ceria-containing molecular sieve is CeCHA.

Embodiment 4

The catalytic article of any preceding embodiment, wherein the ceria in the ceria-containing molecular sieve is present from about 1%, about 2%, about 3%, about 4%, about 5%, about 6%, about 7%, about 8%, about 9% or about 10% to about 12%, about 15%, about 18%, about 20%, about 24%, about 28%, about 32%, about 36%, about 40%, about 45% or about 50% by weight, based on the weight of the ceria-containing molecular sieve.

Embodiment 5

The catalytic article of any preceding embodiment, wherein the ceria-containing molecular sieve is present from about 0.05 g/in$^3$, about 0.1 g/in$^3$, about 0.2 g/in$^3$ or about 0.3 g/in$^3$ to about 0.4 g/in$^3$, about 0.5 g/in$^3$, about 0.6 g/in$^3$, about 0.7 g/in$^3$, about 0.8 g/in$^3$, about 0.9 g/in$^3$, about 1.0 g/in$^3$, about 1.2 g/in$^3$, about 1.6 g/in$^3$ or about 2.0 g/in$^3$, based on the volume of the substrate.

Embodiment 6

The catalytic article of any preceding embodiment, wherein the bottom layer further comprises a hydrocarbon adsorption molecular sieve; for example a H$^+$-form molecular sieve.

Embodiment 7

The catalytic article of any preceding embodiment, wherein the bottom layer further comprises a molecular sieve suitable for hydrocarbon adsorption selected from the group consisting of large pore molecular sieves; for instance large pore molecular sieves selected from the group consisting of framework types AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, RON, RWY, SAF, SAO, SBE, SBS, SBT, SEW, SFE, SFO, SFS, SFV, SOF, SOS, STO, SSF, SSY, USI, UWY, VET and mixtures or intergrowths thereof; for instance large pore molecular sieves selected from the group consisting of framework types AFI, BEA, MAZ, MOR and OFF.

Embodiment 8

The catalytic article of any preceding embodiment, wherein the bottom layer further comprises a molecular sieve for hydrocarbon adsorption from about 0.05 $g/in^3$, about 0.1 $g/in^3$, about 0.2 $g/in^3$ or about 0.3 $g/in^3$ to about 0.4 $g/in^3$, about 0.5 $g/in^3$, about 0.6 $g/in^3$, about 0.7 $g/in^3$, about 0.8 $g/in^3$, about 0.9 $g/in^3$, about 1.0 $g/in^3$, about 1.2 $g/in^3$, about 1.6 $g/in^3$, about 2.0 $g/in^3$, about 2.5 $g/in^3$, about 3.0 $g/in^3$, about 4.0 $g/in^3$, or about 5.0 $g/in^3$ based on the volume of the substrate.

Embodiment 9

The catalytic article of any preceding embodiment, wherein the ceria-containing molecular sieves further contain one or more catalytically active metals selected from the group consisting of copper, iron, manganese, magnesium, cobalt, nickel, platinum, palladium and rhodium.

Embodiment 10

The catalytic article of any preceding embodiment, wherein the ceria-containing molecular sieves further contain one or more catalytically active metals selected from the group consisting of manganese, magnesium, platinum and palladium.

Embodiment 11

The catalytic article of any preceding embodiment, wherein the ceria-containing molecular sieves further contain one or more catalytically active metals from about 3 $g/ft^3$, about 4 $g/ft^3$, about 5 $g/ft^3$, about 6 $g/ft^3$, about 7 $g/ft^3$, about 8 $g/ft^3$, about 9 $g/ft^3$ or about 10 $g/ft^3$ to about 12 $g/ft^3$, about 14 $g/ft^3$, about 16 $g/ft^3$, about 18 $g/ft^3$, about 20 $g/ft^3$, about 22 $g/ft^3$, about 24 $g/ft^3$, about 26 $g/ft^3$, about 28 $g/ft^3$, about 30 $g/ft^3$, about 35 $g/ft^3$, about 40 $g/ft^3$, about 45 $g/ft^3$, about 50 $g/ft^3$, about 55 $g/ft^3$, about 60 $g/ft^3$, about 65 $g/ft^3$, about 70 $g/ft^3$, about 75 $g/ft^3$, about 80 $g/ft^3$, about 85 $g/ft^3$, about 90 $g/ft^3$, about 95 $g/ft^3$, or about 100 $g/ft^3$, based on the volume of the substrate.

Embodiment 12

The catalytic article of any preceding embodiment, wherein the refractory metal oxide support comprises alumina, titania, zirconia; a mixture of alumina with one or more of titania, zirconia and ceria; ceria coated on alumina; titania coated on alumina; silica-alumina; aluminosilicates; alumina-zirconia; alumina-chromia; or alumina-ceria.

Embodiment 13

The catalytic article of any preceding embodiment, wherein the refractory metal oxide support is selected from the group consisting of gamma alumina, silica-alumina, ceria coated on alumina, and titania coated on alumina.

Embodiment 14

The catalytic article of any preceding embodiment, wherein the top catalytic layer comprises from about 15 wt. %, about 20 wt. %, about 25 wt. %, about 30 wt. % or about 35 wt. % to about 50 wt. %, about 55 wt. %, about 60 wt. % about 65 wt. %, about 70 wt. %, about 75 wt. %, about 80 wt. %, about 85 wt. %, about 90 wt. % or about 95 wt. % alumina, based on the weight of the top catalytic layer.

Embodiment 15

The catalytic article of any preceding embodiment, wherein the refractory metal oxide support is present at a concentration of from about 0.5 $g/in^3$, about 0.8 $g/in^3$ or about 1.0 $g/in^3$ to about 2.0 $g/in^3$, about 3.0 $g/in^3$, about 4.0 $g/in^3$, about 5.0 $g/in^3$, about 6.0 $g/in^3$ or about 7.0 $g/in^3$, based on the substrate.

Embodiment 16

The catalytic article of any preceding embodiment, wherein the platinum group metal of the top coating layer is present from about 2 $g/ft^3$, about 5 $g/ft^3$, about 10 $g/ft^3$ to about 250 $g/ft^3$, for example from about 20 $g/ft^3$, about 30 $g/ft^3$, about 40 $g/ft^3$, about 50 $g/ft^3$ or about 60 $g/ft^3$ to about 100 $g/ft^3$, about 150 $g/ft^3$ or about 200 $g/ft^3$, based on the substrate.

Embodiment 17

The catalytic article of any preceding embodiment, wherein the substrate is a porous wall-flow filter.

Embodiment 18

The catalytic article of any of embodiments 1-16, wherein the substrate is a flow-through monolith.

Embodiment 19

The catalytic article of any preceding embodiment, wherein the bottom coating layer is in direct contact with the substrate.

Embodiment 20

The catalytic article of any preceding embodiment, wherein the top coating layer is in direct contact with the bottom coating layer.

Embodiment 21

The catalytic article of any of embodiments 1-18 or 20, wherein the catalytic coating comprises an undercoat layer.

Embodiment 22

The catalytic article of any preceding embodiment, wherein the catalytic coating comprises an overcoat layer.

Embodiment 23

The catalytic article of any of embodiments 1-19, 21, or 22, wherein the catalytic coating comprises an interlayer between the top and bottom coating layers.

Embodiment 24

The catalytic article of any preceding embodiment, wherein the catalytic coating comprises an undercoat layer, an overcoat layer or an interlayer, where one or more of said layers are substantially free of PGM components.

Embodiment 25

The catalytic article of any preceding embodiment, wherein the catalytic coating is present at a loading from about 0.3 g/in$^3$ to about 4.5 g/in$^3$; or from about 0.4, about 0.5, about 0.6, about 0.7, about 0.8, about 0.9 or about 1.0 g/in$^3$ to about 1.5 g/in$^3$, about 2.0 g/in$^3$, about 2.5 g/in$^3$, about 3.0 g/in$^3$, about 3.5 g/in$^3$, about 4.0 g/in$^3$, about 4.5 g/in$^3$, about 5.0 g/in$^3$, about 5.5 g/in$^3$, about 6.0 g/in$^3$, about 6.5 g/in$^3$, or about 7.0 g/in$^3$, based on the substrate.

Embodiment 26

The catalytic article of any preceding embodiment, wherein the top coating layer is present at a lower loading than the bottom coating layer.

Embodiment 27

The catalytic article of any preceding embodiment, wherein the top coating layer is present at a loading of from about 0.4, about 0.5, about 0.6, about 0.7, about 0.8, about 0.9 or about 1.0 g/in$^3$ to about 1.5 g/in$^3$, about 2.0 g/in$^3$, about 2.5 g/in$^3$, about 3.0 g/in$^3$ or about 3.5 g/in$^3$, based on the substrate.

Embodiment 28

The catalytic article of any preceding embodiment, wherein the bottom coating layer is present at a loading of from about 0.4, about 0.5, about 0.6, about 0.7, about 0.8, about 0.9 or about 1.0 g/in$^3$ to about 1.5 g/in$^3$, about 2.0 g/in$^3$, about 2.5 g/in$^3$, about 3.0 g/in$^3$, about 3.5 g/in$^3$ or about 4.0 g/in$^3$ based on the substrate.

Embodiment 29

The catalytic article of any preceding embodiment, downstream of and in flow communication with an internal combustion engine.

Embodiment 30

The catalytic article of any preceding embodiment, wherein the top coating layer overlays the entire bottom coating layer.

Embodiment 31

The catalytic article of any preceding embodiment, wherein the bottom coating layer extends the entire axial length of the substrate.

Embodiment 32

The catalytic article of any preceding embodiment, wherein the top coating layer extends the entire axial length of the substrate.

Embodiment 33

The catalytic article of any of embodiments 1-30 and 32 where the bottom coating layer extends from about 10%, about 15%, about 25%, about 30%, about 35%, about 40% or about 45% to about 50%, about 55%, about 60%, about 65%, about 70%, about 75%, about 85%, about 90% or about 95% of the axial length of the substrate, from either an inlet or outlet end.

Embodiment 34

The catalytic article of any of embodiments 1-31 or 33, wherein where the top coating layer extends from about 10%, about 15%, about 25%, about 30%, about 35%, about 40% or about 45% to about 50%, about 55%, about 60%, about 65%, about 70%, about 75%, about 85%, about 90% or about 95% of the axial length of the substrate, from either an inlet or outlet end.

Embodiment 35

An exhaust gas treatment system comprising the catalytic article of any preceding embodiment.

Embodiment 36

The exhaust gas treatment system of the preceding embodiment, further comprising a catalytic article selected from the group consisting of an urea injector, a selective catalytic reduction catalyst, a diesel oxidation catalyst, a soot filter, an ammonia oxidation catalyst and a lean NOx trap.

Embodiment 37

The exhaust gas treatment system of any preceding embodiment, downstream of and in fluid communication with an internal combustion engine.

Embodiment 38

A method for treating an exhaust gas stream comprising hydrocarbons and/or carbon monoxide and/or NOx, the method comprising passing the exhaust stream through a catalytic article or system according to any of the preceding claims.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise. Other aspects and advantages of the present invention will become apparent from the following.

BRIEF DESCRIPTION OF THE DRAWINGS

In order to provide an understanding of embodiments of the invention, reference is made to the appended drawings, which are not necessarily drawn to scale, and in which reference numerals refer to components of exemplary embodiments of the invention. The drawings are exemplary only, and should not be construed as limiting the invention.

FIG. 1b is a partial cross-sectional view enlarged relative to FIG. 1a and taken along a plane parallel to the end faces of the substrate of FIG. 1a, representing a monolithic flow-through substrate, which shows an enlarged view of a plurality of the gas flow passages shown in FIG. 1a;

FIGS. 3-8 show CO light-off performance of powder samples of Example 1 (providing data for fresh, aged, sulfated and desulfated catalyst powders), wherein:

FIG. 3 shows CO light-off performance of a 2% Pd on ceria powder sample 2 after aging, sulfur exposure, and desulfation;

FIG. 4 shows a comparison of Pd/ceria powder sample 2 vs. Pd/Ce/CHA powder sample 3 performance after desulfation at 650° C.;

FIG. 5 shows a comparison of Pd/ceria powder sample 2 vs. Pd/CHA performance after desulfation at 650° C.;

FIG. 6 shows a comparison of Pd/ceria powder sample 2 vs. Pd/Ce/ZSM-5 powder sample 4 performance, after desulfation at 650° C.;

FIG. 7 shows a comparison of Pd/ceria powder sample 2 vs. Pd/Ce/Beta powder sample 5 performance, after desulfation at 650° C.;

FIG. 8 shows a comparison of Pd/(10%)Ce/Beta powder sample 5 vs. Pd/(20%)Ce/Beta powder sample 6 performance, after desulfation at 650° C.;

DETAILED DESCRIPTION

Figure 1A:
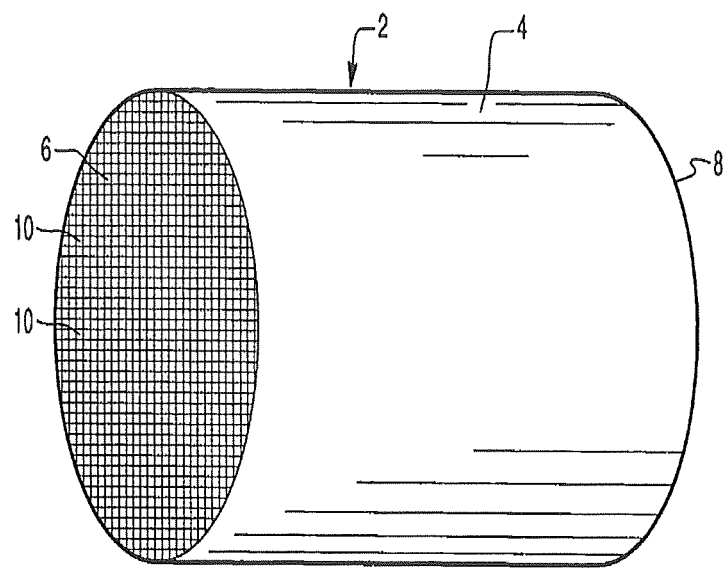
FIG. 1a is a perspective view of a honeycomb-type substrate which may comprise a catalytic article in accordance with the present invention.

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art. As used in this specification and the claims, the singular forms "a," "an," and "the" include plural referents unless the context clearly dictates otherwise.

The present catalyst compositions are suitable for treatment of exhaust gas streams of internal combustion engines, for example gasoline, light-duty diesel and heavy-duty diesel engines. In some embodiments, such catalyst compositions can be combined with other components, e.g., with other catalyst compositions to provide compositions and articles suitable for use as diesel oxidation catalysts or catalyzed soot filters. The catalyst compositions are also suitable for treatment of emissions from stationary industrial processes, removal of noxious or toxic substances from indoor air or for catalysis in chemical reaction processes.

In particular, the catalyst compositions disclosed herein comprise one or more molecular sieves, wherein the molecular sieves contain palladium and ceria. Such compositions can be used alone or in combination with other catalyst compositions, e.g., a catalyst composition comprising a platinum group metal (PGM) on a refractory metal oxide. As used herein, the term "catalyst" or "catalyst composition" refers to a material that promotes a reaction.

As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine.

As used herein, the term "stream" broadly refers to any combination of flowing gas that may contain solid or liquid particulate matter. The term "gaseous stream" or "exhaust stream" or "exhaust gas stream" means a stream of gaseous constituents, such as the exhaust of a combustion engine, which may contain entrained non-gaseous components such as liquid droplets, solid particulates, and the like. The exhaust gas stream of a combustion engine typically further comprises combustion products ($CO_2$ and $H_2O$), products of incomplete combustion (carbon monoxide (CO) and hydrocarbons (HC)), oxides of nitrogen ($NO_x$), combustible and/or carbonaceous particulate matter (soot), and un-reacted oxygen and nitrogen.

As used herein, the term "substrate" refers to the monolithic material onto which the catalyst composition is placed.

As used herein, the term "support" refers to any high surface area material, usually a metal oxide material, upon which a catalytic precious metal is applied.

As used herein, the term "washcoat" has its usual meaning in the art of a thin, adherent coating of a catalytic or other material applied to a substrate material, such as a honeycomb-type carrier member, which is sufficiently porous to permit the passage of the gas stream being treated. A washcoat is formed by preparing a slurry containing a certain solid content (e.g., 20%-90% by weight) of particles in a liquid vehicle, which is then coated onto a substrate and dried to provide a washcoat layer.

As used herein, the term "catalytic article" refers to an element that is used to promote a desired reaction. For example, a catalytic article may comprise a washcoat containing catalytic compositions on a substrate.

As used herein, "impregnated" or "impregnation" refers to permeation of the catalytic material into the porous structure of the support material.

The terms "on" and "over" in reference to a coating layer may be used synonymously. The term "directly on" means in direct contact with. The disclosed articles are referred to in certain embodiments as comprising one coating layer "on" a second coating layer, and such language is intended to encompass embodiments with intervening layers, where direct contact between the coating layers is not required (i.e., "on" is not equated with "directly on").

"Substantially free" means "little or no" or "no intentionally added" and also having only trace and/or inadvertent amounts. For instance, in certain embodiments, "substantially free" means less than 2 wt. % (weight %), less than 1.5 wt. %, less than 1.0 wt. %, less than 0.5 wt. %, 0.25 wt. % or less than 0.01 wt. %, based on the weight of the indicated total composition.

D90 particle size distribution indicates that 90% of the particles (by number) have a Feret diameter below a certain size as measured by Scanning Electron Microscopy (SEM) or Transmission Electron Microscopy (TEM) for submicron size particles; and a particle size analyzer for the support-containing particles (micron size). "Average particle size" is synonymous with D50, meaning half of the population of particles has a particle size above this point, and half below. Particle size refers to primary particles. Particle size may be measured by laser light scattering techniques, with dispersions or dry powders, for example according to ASTM method D4464.

The term "abatement" means a decrease in the amount, caused by any means.

Catalytic Material

The catalytic material of the present disclosure includes a catalyst composition comprising a molecular sieve containing palladium and ceria (referred to herein as the "Pd and ceria molecular sieve composition). In some embodiments, the catalytic material further includes a catalyst composition comprising a platinum group metal (PGM) on a refractory metal oxide support (referred to herein as the "PGM composition"). In embodiments employing both the Pd and ceria molecular sieve composition and the PGM composition, these compositions can be, for example, disposed onto a substrate in a layered configuration to generate a catalytic article as will be described in detail herein below.

Pd and Ceria Molecular Sieve Composition

The Pd and ceria molecular sieve composition generally comprises one or more molecular sieves containing a Pd component (e.g., Pd) and ceria.

Molecular sieves include small pore, medium pore and large pore molecular sieves or combinations thereof. A small pore molecular sieve contains channels defined by up to eight tetrahedral atoms. A medium pore molecular sieve contains channels defined by ten-membered rings. A large pore molecular sieve contains channels defined by twelve-membered rings.

Small pore molecular sieves are selected from the group consisting aluminosilicate molecular sieves, metal-containing aluminosilicate molecular sieves, aluminophosphate (ALPO) molecular sieves, metal-containing aluminophosphate (MeALPO) molecular sieves, silico-aluminophosphate (SAPO) molecular sieves, and metal-containing silico-aluminophosphate (MeSAPO) molecular sieves and mixtures thereof. For example, small pore molecular sieves are selected from the group consisting of framework types ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, ZON and mixtures or intergrowths thereof. For instance, the small pore molecular sieve is selected from the group of framework types CHA, LEV, AEI, AFX, ERI, SFW, KFI, DDR and ITE.

Medium pore molecular sieves are selected from the group consisting of framework types AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, PAR, PCR, PON, PUN, RRO, RSN, SFF, SFG, STF, STI, STT, STW, SVR, SZR, TER, TON, TUN, UOS, VSV, WEI, WEN and mixtures or intergrowths thereof. For instance, the medium pore molecular sieves are selected from the group consisting of framework types FER, MEL, MFI and STT.

Large pore molecular sieves are selected from the group consisting of framework types AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, RON, RWY, SAF, SAO, SBE, SBS, SBT, SEW, SFE, SFO, SFS, SFV, SOF, SOS, STO, SSF, SSY, USI, UWY, VET and mixtures or intergrowths thereof. For instance, the large pore molecular sieves can be selected from the group consisting of framework types AFI, BEA, MAZ, MOR and OFF.

For example, molecular sieves comprise a framework type selected from the group consisting of AEI, BEA (beta zeolites), CHA (chabazite), FAU (zeolite Y), FER (ferrierite), MFI (ZSM-5) and MOR (mordenite). Non-limiting examples of zeolites having these structures include chabazite, faujasite, zeolite Y, ultrastable zeolite Y, Beta zeolite, mordenite, silicalite, zeolite X, and ZSM-5.

The present molecular sieves may exhibit a high surface area, for example a BET surface area, determined according to DIN 66131, of at least about 300 $m^2/g$, at least about 400 $m^2/g$, at least about 550 $m^2/g$ or at least about 650 $m^2/g$, for example from about 400 to about 750 $m^2/g$ or from about 500 to about 750 $m^2/g$. The present molecular sieves may have a mean crystal size of from about 10 nanometers to about 10 microns, from about 50 nanometers to about 5 microns or from about 0.1 microns to about 0.5 microns as determined via SEM. For instance, the molecular sieve crystallites may have a crystal size greater than 0.1 microns or 1 micron and less than 5 microns.

Useful molecular sieves have 8-ring pore openings and double-six ring secondary building units, for example, those having structure types AEI, AFT, AFX, CHA, EAB, ERI, KFI, LEV, SAS, SAT or SAV. Included are any and all isotopic framework materials such as SAPO, ALPO and MeAPO materials having the same structure type.

Aluminosilicate zeolite structures do not include phosphorus or other metals isomorphically substituted in the framework. That is, "aluminosilicate zeolite" excludes aluminophosphate materials such as SAPO, ALPO and MeAPO materials, while the broader term "zeolite" includes aluminosilicates and aluminophosphates. In this disclosure, SAPO, ALPO and MeAPO materials are considered non-zeolitic molecular sieves.

The 8-ring small pore molecular sieves include aluminosilicates, borosilicates, gallosilicates, MeAPSOs and MeAPOs. These include for example SSZ-13, SSZ-62, natural chabazite, zeolite K-G, Linde D, Linde R, LZ-218, LZ-235, LZ-236, ZK-14, SAPO-34, SAPO-44, SAPO-47, ZYT-6, CuSAPO-34, CuSAPO-44 and CuSAPO-47. In some embodiments, the 8-ring small pore molecular sieve will have an aluminosilicate composition, such as SSZ-13 and SSZ-62.

In one or more embodiments, the 8-ring small pore molecular sieve has the CHA crystal structure and is selected from the group consisting of aluminosilicate zeolite having the CHA crystal structure, SAPO, ALPO and MeAPO. For example, the 8-ring small pore molecular sieve having the CHA crystal structure is an aluminosilicate zeolite having the CHA crystal structure. In one embodiment, the 8-ring small pore molecular sieve having the CHA crystal structure will have an aluminosilicate composition, such as SSZ-13 and SSZ-62.

Molecular sieves can be zeolitic (zeolites) or may be non-zeolitic. Both zeolitic and non-zeolitic molecular sieves can have the chabazite crystal structure, which is also referred to as the CHA structure by the International Zeolite Association. Zeolitic chabazite includes a naturally occurring tectosilicate mineral of a zeolite group with approximate formula $(Ca,Na_2,K_2,Mg)Al_2Si_4O_{12}\cdot 6H_2O$ (i.e., hydrated calcium aluminum silicate). Three synthetic forms of zeolitic chabazite are described in "Zeolite Molecular Sieves," by D. W. Breck, published in 1973 by John Wiley & Sons, which is hereby incorporated by reference. The three synthetic forms reported by Breck are Zeolite K-G, described in J. Chem. Soc., p. 2822 (1956), Barrer et al.; Zeolite D, described in British Patent No. 868,846 (1961); and Zeolite R, described in U.S. Pat. No. 3,030,181, which are all incorporated herein by reference. Synthesis of another synthetic form of zeolitic chabazite, SSZ-13, is described in U.S. Pat. No. 4,544,538, which is incorporated herein by reference. Synthesis of a synthetic form of a non-zeolitic molecular sieve having the chabazite crystal structure, silicoaluminophosphate 34 (SAPO-34), is described in U.S. Pat. Nos. 4,440,871 and 7,264,789, which are incorporated herein by reference. A method of making yet another synthetic non-zeolitic molecular sieve having chabazite structure, SAPO-44, is described for instance in U.S. Pat. No. 6,162,415, which is incorporated herein by reference.

A synthetic 8-ring small pore molecular sieve (for example having the CHA structure) may be prepared via mixing a source of silica, a source of alumina and a structure directing agent under alkaline aqueous conditions. Typical silica sources include various types of fumed silica, precipitated silica and colloidal silica, as well as silicon alkoxides. Typical alumina sources include boehmites, pseudo-boehmites, aluminum hydroxides, aluminum salts such as aluminum sulfite or sodium aluminate and aluminum alkoxides. Sodium hydroxide is typically added to the reaction mixture. A typical structure directing agent for this synthesis is adamantyltrimethyl ammonium hydroxide, although other amines and/or quaternary ammonium salts may be substituted or added. The reaction mixture is heated in a pressure vessel with stirring to yield a crystalline product. Typical reaction temperatures are in the range of from about 100° C. to about 200° C., for instance from about 135° C. to about 170° C. Typical reaction times are between 1 hr and 30 days and in some embodiments, from 10 hours to 3 days. At the conclusion of the reaction, the pH is optionally adjusted to between 6 and 10, for example between 7 and 7.5 and the product is filtered and washed with water. Any acid can be used for pH adjustment, for instance nitric acid. Optionally, the product may be centrifuged. Organic additives may be used to help with the handling and isolation of the solid product. Spray-drying is an optional step in the processing of the product. The solid product is thermally treated in air or nitrogen. Alternatively, each gas treatment can be applied in various sequences or mixtures of gases can be applied. Typical calcination temperatures are in from about 400° C. to about 850° C.

Molecular sieves having a CHA structure may be prepared, for instance, according to methods disclosed in U.S. Pat. Nos. 4,544,538 and 6,709,644, which are incorporated herein by reference.

The molecular sieves within the Pd and ceria molecular sieve composition may have a silica to alumina ratio (SAR) of from about 1, about 2, about 5, about 8, about 10, about 15, about 20 or about 25 to about 30, about 35, about 40, about 45, about 50, about 60, about 70, about 80 about 90, about 100, about 150, about 200, about 260, about 300, about 400, about 500, about 750 or about 1000. For instance, certain molecular sieves that can be incorporated within the catalyst composition may have a SAR of from about 5 to about 250, from about 10 to about 200, from about 2 to about 300, from about 5 to about 250, from about 10 to about 200, from about 10 to about 100, from about 10 to about 75, from about 10 to about 60, from about 10 to about 50, from about 15 to about 100, from about 15 to about 75, from about 15 to about 60, from about 15 to about 50, from about 20 to about 100, from about 20 to about 75, from about 20 to about 60 or from about 20 to about 50.

Advantageously, the molecular sieves of the present catalyst compositions are small pore or medium pore molecular sieves.

The cerium of the ceria-containing molecular sieves may reside either in the ion-exchange sites of the molecular sieves or on the surface or both. The disclosed catalyst compositions, described as comprising molecular sieves "containing" ceria, are thus understood to comprise the ceria in the ion exchange sites and/or on the surface of the molecular sieves. For example, upon calcination, non-exchanged cerium salt decomposes to cerium oxides, including $CeO_2$ and $Ce_2O_3$, wherein cerium is in the +3 or +4 oxidation state, also referred to herein as "free cerium," or advantageously as "ceria." The amount of free cerium may be less than, equal to or greater than the amount of ion-exchanged cerium. The ceria-containing molecular sieves may be prepared via ion-exchange from, for example, a $Na^+$ containing molecular sieve ($Na^+$-form). The $Na^+$-form generally refers to the calcined form without any ion exchange. In this form, the molecular sieve generally contains a mixture of $Na^+$ and $H^+$ cations in the exchange sites. The fraction of sites occupied by $Na^+$ cations varies depending on the specific zeolite batch and recipe. Optionally, the alkali metal molecular sieves are $NH_4^+$-exchanged and the $NH_4^+$-form is employed for ion-exchange. Optionally, the $NH_4^+$-exchanged molecular sieve is calcined to the $H^+$-form, which may also be employed for ion-exchange. Cerium is ion-exchanged into molecular sieves with alkali metal, $NH_4^+$- or $H^+$-forms with one or more cerium salts. In general, any water-soluble cerium salt may be used, with non-limiting examples of such salts including cerium nitrate. For instance, a $Na^+$-, $NH_4^+$- or $H^+$-form of a molecular sieve is mixed with an aqueous cerium salt solution and agitated at an elevated temperature for a suitable time (e.g., about 60-120° C. for about 30 minutes to 3 hours). The slurry is filtered and the filter cake is washed and dried. Other processes of applying cerium onto a molecular sieve include an incipient wetness impregnation process. Combinations of processes may be employed to reach a desired ceria loading.

In some embodiments, the disclosed catalyst compositions are described as comprising molecular sieves "containing" palladium, and in such instances, "containing" similarly is understood to mean that the palladium resides either in the ion-exchange sites of the molecular sieves or on the surface, or both. Where a molecular sieve is described as containing both "free cerium" and palladium, both the free cerium and palladium reside in the ion-exchange sites and/or on the surface of the molecular sieve. Typically, the free cerium particles used in the catalyst of the invention are larger than palladium, such that a relatively larger amount or even a majority of the free cerium is located on the surface of the molecular sieve; however, the disclosed catalyst compositions are not limited to such embodiments. In certain embodiments, the palladium is advantageously supported by ceria.

The disclosed compositions may be prepared, in some embodiments, via an incipient wetness impregnation method. For example, cerium may be impregnated on a molecular sieve first, followed by palladium. Alternatively, palladium and cerium salts may be mixed together and the mixture impregnated on a molecular sieve. Salts include, but are not limited to, nitrate salts. Further, at least a portion of a catalytically active metal may be included during a molecular sieve synthetic process such that a tailored colloid contains a structure directing agent, a silica source, an alumina source and a metal ion (e.g. cerium) source. In some embodiments, palladium and other metal salts may be mixed together and the mixture impregnated on a molecular sieve. The metals used in the salts include, but not limited to, metals selected from the group consisting of copper, iron, manganese, magnesium, cobalt, nickel, platinum and rhodium, and combinations thereof.

The amount of ceria in the catalyst composition is for example from about 1 to about 50 wt. % (weight percent), based on the total weight of the catalyst composition. The ceria in the catalyst composition is present for example from about 1%, about 2%, about 3%, about 4%, about 5%, about 6%, about 7%, about 8%, about 9% or about 10% to about 12%, about 15%, about 18%, about 20%, about 24%, about 28%, about 32%, about 36%, about 40%, about 45% or about 50% by weight, based on the total weight of the catalyst composition.

Palladium is present in the catalyst composition, for example, from about 0.1%, about 0.2%, about 0.5%, about 0.7%, about 0.9% or about 1.0% to about 1.5%, about 2.0%, about 2.5%, about 3.0%, about 3.5%, about 4.0%, about 4.5% or about 5.0% by weight, based on the total weight of the catalyst composition. Weight levels of palladium are measured and reported as the oxide. The total dry weight of the molecular sieve includes any added/exchanged metals like cerium.

The molecular sieves may have a sodium content (reported as $Na_2O$ on a volatile free basis) of up to 10 wt. %, based on the total weight of the calcined molecular sieve. The molecular sieves may each have an atomic sodium to aluminum ratio of from about 0.02 to about 2.0. The molecular sieves may each have an atomic ceria to sodium ratio of from about 0.5 to about 500.

While the foregoing description provides several suitable ranges or amounts for the ceria, palladium, and molecular sieve components of the catalyst composition, it should be noted that each disclosed range or amount for one of these components may be combined with a disclosed range or amount for the other components to form new ranges or sub-ranges. Such embodiments are also expressly contemplated by the invention.

The Pd and ceria molecular sieve composition may, in some embodiments, contain other catalytically active metals such as copper, iron, manganese, magnesium, cobalt, nickel, platinum, palladium, rhodium or combinations thereof. Such metals can, in some embodiments, be present such that the molecular sieves further contain the one or more catalytically active metals selected from the group consisting of copper, iron, manganese, magnesium, cobalt, nickel, platinum and rhodium. Alternatively, the Pd and ceria molecular sieve composition may be substantially free of one or more of these metals.

In some embodiments, the palladium further contains one or more catalytically active metals selected from the group consisting of copper, iron, manganese, magnesium, cobalt, nickel, platinum, and rhodium.

PGM Composition

The PGM composition generally comprises at least one PGM component on at least one refractory metal support. "Platinum group metal components" refer to platinum group metals or compounds thereof, for example oxides. Platinum group metals are ruthenium, rhodium, palladium, osmium, iridium and platinum.

With respect to the PGM-containing composition that can, in some embodiments, be employed along with the catalyst composition disclosed herein, the composition of the PGM-containing catalyst composition can vary, but generally comprises one or more PGMs supported on one or more refractory metal oxides. Refractory metal oxides are porous metal-containing oxide materials that exhibit chemical and physical stability at high temperatures, such as the temperatures associated with gasoline or diesel engine exhaust. Exemplary metal oxides include alumina, silica, zirconia, titania, ceria, praseodymia, tin oxide, and the like, as well as physical mixtures or chemical combinations thereof, including atomically-doped combinations and including high surface area or activated compounds such as activated alumina.

High surface area refractory metal oxides include alumina, titania, zirconia; mixtures of alumina with one or more of titania, zirconia and ceria; ceria coated on alumina or titania coated on alumina. The refractory metal oxide may contain an oxide or a mixed oxide such as silica-alumina, aluminosilicates which may be amorphous or crystalline, alumina-zirconia, alumina-chromia, alumina-ceria, and the like. The refractory metal oxides are, in particular, gamma alumina, silica-alumina, ceria coated on alumina, titania coated on alumina, or zirconia coated on alumina.

Included are combinations of metal oxides such as silica-alumina, ceria-zirconia, praseodymia-ceria, alumina-zirconia, alumina-ceria-zirconia, lanthana-alumina, lanthana-zirconia-alumina, baria-alumina, baria-lanthana-alumina, baria-lanthana-neodymia alumina and alumina-ceria. Exemplary aluminas include large pore boehmite, gamma-alumina, and delta/theta alumina. Useful commercial aluminas used as starting materials in exemplary processes include activated aluminas, such as high bulk density gamma-alumina, low or medium bulk density large pore gamma-alumina and low bulk density large pore boehmite and gamma-alumina.

High surface area metal oxide supports, such as alumina support materials, also referred to as "gamma alumina" or "activated alumina," typically exhibit a BET surface area in excess of 60 $m^2/g$, often up to about 200 $m^2/g$ or higher. An exemplary refractory metal oxide comprises high surface area γ-alumina having a specific surface area of about 50 to about 300 $m^2/g$. Such activated alumina is usually a mixture of the gamma and delta phases of alumina, but may also contain substantial amounts of eta, kappa and theta alumina phases. "BET surface area" has its usual meaning of referring to the Brunauer-Emmett-Teller method for determining surface area by $N_2$ adsorption measurements. Unless otherwise stated, "surface area" refers to BET surface area. Desirably, the active alumina has a specific surface area of about 60 to about 350 $m^2/g$, for example from about 90 to about 250 $m^2/g$.

In certain embodiments, metal oxide supports useful in the PGM-containing catalyst compositions disclosed herein are doped alumina materials, such as Si-doped alumina materials (including, but not limited to 1-10% $SiO_2$—$Al_2O_3$), doped titania materials, such as Si-doped titania materials (including, but not limited to 1-10% $SiO_2$—$TiO_2$), or doped zirconia materials, such as Si-doped $ZrO_2$ (including, but not limited to 5-30% $SiO_2$—$ZrO_2$). Advantageously, a refractory metal oxide may be doped with one or more additional metal oxide dopants, such as lanthana, baria, strontium oxide, calcium oxide, magnesium oxide, or combinations thereof. The metal oxide dopant is typically present in an amount of about 1 to about 20% by weight, based on the weight of the top catalytic layer. The dopant metal oxides can be introduced, e.g., using an incipient wetness impregnation technique or through usage of colloidal mixed oxide particles. Preferred dopant metal oxides include colloidal baria-alumina, baria-zirconia, baria-titania, zirconia-alumina, baria-zirconia-alumina, lanthana-zirconia and the like.

Thus, the refractory metal oxides or refractory mixed metal oxides in a catalytic layer are most typically selected from the group consisting of alumina, zirconia, silica, titania, ceria, for example bulk ceria, manganese oxide, zirconia-alumina, ceria-zirconia, ceria-alumina, lanthana-alumina, baria-alumina, silica, silica-alumina and combinations thereof. These refractory metal oxides in a catalytic layer may be further doped with base metal oxides such as baria-alumina, baria-zirconia, baria-titania, zirconia-alumina, baria-zirconia-alumina, lanthana-zirconia and the like.

A catalytic layer or total coating may comprise any of the above-named refractory metal oxides and in any amount. For example, the refractory metal oxides in a catalytic layer may comprise at least about 15, at least about 20, at least about 25, at least about 30 or at least about 35 wt. % (weight %) alumina where the wt. % is based on the total dry weight of the catalytic layer. A catalytic layer may for example comprise from about 15 to about 95 wt. % alumina or from about 20 to about 85 wt. % alumina.

A catalytic layer (or total coating) comprises for example from about 15 wt. %, about 20 wt. %, about 25 wt. %, about 30 wt. % or about 35 wt. % to about 50 wt. %, about 55 wt. %, about 60 wt. % about 65 wt. % or about 70 wt. % alumina based on the weight of the catalytic layer. A refractory metal oxide support may be present, for instance, in a concentration of from about 0.5 $g/in^3$, about 0.8 $g/in^3$ or about 1.0 $g/in^3$ to about 2.0 $g/in^3$, about 3.0 $g/in^3$, about 4.0 $g/in^3$, about 5.0 $g/in^3$ or about 6.0 $g/in^3$, based on the substrate. Advantageously, a top catalytic layer may comprise ceria, alumina and zirconia.

The PGM component of the PGM-containing catalyst composition may be dispersed on a refractory metal oxide support by, for example, dispersing a soluble precursor (e.g., palladium nitrate) thereon. Alternatively, the component is provided in particulate form in the composition, such as fine particles as small as 1 to 15 nanometers in diameter or smaller, as opposed to being dispersed on the support. The loading of the platinum group metal component may be in the range of about 2 $g/ft^3$, about 5 $g/ft^3$, about 10 $g/ft^3$ to about 250 $g/ft^3$, for example from about 20 $g/ft^3$, about 30 $g/ft^3$, about 40 $g/ft^3$, about 50 $g/ft^3$ or about 60 $g/ft^3$ to about 100 $g/ft^3$, about 150 $g/ft^3$ or about 200 $g/ft^3$, based on the substrate. A platinum group metal component in different coating layers may be identical or different. Likewise, the amounts of platinum group metal components in different layers may be identical or different.

The PGM component is, for example, present in a catalytic layer from about 0.1 wt. %, about 0.5 wt. %, about 1.0 wt. %, about 1.5 wt. % or about 2.0 wt. % to about 3 wt. %, about 5 wt. %, about 7 wt. %, about 9 wt. %, about 10 wt. %, about 12 wt. % or about 15 wt. %, based on the weight of the layer. A PGM component may be present in a top and bottom catalytic layer also at these levels.

Further catalytically active metals may be present in any of the catalytic compositions from about 3 $g/ft^3$, about 4 $g/ft^3$, about 5 $g/ft^3$, about 6 $g/ft^3$, about 7 $g/ft^3$, about 8 $g/ft^3$, about 9 $g/ft^3$ or about 10 $g/ft^3$ to about 12 $g/ft^3$, about 14 $g/ft^3$, about 16 $g/ft^3$, about 18 $g/ft^3$, about 20 $g/ft^3$, about 22 $g/ft^3$, about 24 $g/ft^3$, about 26 $g/ft^3$, about 28 $g/ft^3$, about 30 $g/ft^3$, about 35 $g/ft^3$, about 40 $g/ft^3$, about 50 $g/ft^3$, about 60 $g/ft^3$, about 70 $g/ft^3$, about 80 $g/ft^3$, about 90 $g/ft^3$, or about 100 $g/ft^3$, based on the volume of the substrate. Further catalytically active metals include Cu, Fe, Mn, Mg, Co and Ni. In some embodiments, the PGM composition (and/or the Pd and ceria molecular sieve composition) may also contain a molecular sieve suitable for HC adsorption. In some embodiments, these molecular sieves are selected from $H^+$-forms of large pore molecular sieves such as Beta zeolite. Also suitable is FeBeta. Other large pore molecular sieves are those listed above and also ZSM-12, SAPO-37, etc. The molecular sieve suitable for HC adsorption may be the same or different than the molecular sieve of the ceria-containing molecular sieves described herein above.

The molecular sieves suitable for HC adsorption are for instance porous molecular sieve particles wherein greater than 90% of the molecular sieve particles have a particle size greater than 1 μm. In some embodiments, the molecular sieve particle size has a $d_{50}$ less than 80 microns. In one or more embodiments, the molecular sieve particles have a $d_{50}$ less than 80, 70, 60, 55, 50, 45, 40, 35, 30, 25, 20, 15, or 10 microns. In some embodiments, the molecular sieve particle size has a $d_{50}$ less than 50 microns. In some embodiments, greater than 95% of the molecular sieve particles have a particle size greater than 1 μm and in more specific embodiments, greater than 96% of the molecular sieve particles have a particle size greater than 1 μm and in even more specific embodiments, the molecular sieve particle component comprises about 96% particles greater than 1 μm and about 85% of particles greater than 2 μm, and in highly specific embodiments, the molecular sieve particle component comprises about 96% particles within 5 μm of the mean particle size and the mean particle size is greater than about 5 μm. In one or more embodiments, the molecular sieve particle component comprises 96% particles in the range of about 1 μm to 10 μm. Molecular sieves suitable for HC adsorption are disclosed, for example, in U.S. Pat. App. Publ. No. 2016/0136626 and U.S. Pat. No. 9,321,042, which are incorporated herein by reference.

The optional hydrocarbon adsorption material is advantageously a zeolite. The zeolite can be a natural or synthetic zeolite such as faujasite, chabazite, clinoptilolite, mordenite, silicalite, zeolite X, zeolite Y, ultrastable zeolite Y, ZSM-5 zeolite, offretite, or a Beta zeolite. Zeolite adsorbent materials may have a high silica to alumina ratio. The zeolites may have a silica/alumina molar ratio of from at least about 5:1, preferably at least about 50:1, with useful ranges of from about 5:1 to 1000:1, 50:1 to 500:1, as well as about 25:1 to 300:1. Suitable Zeolites include ZSM, Y and Beta zeolites. A HC adsorbent may comprise a Beta zeolite of the type disclosed in U.S. Pat. No. 6,171,556, which is incorporated herein by reference.

Catalyst Article

The present disclosure provides one or more catalyst articles, each catalyst article comprising a substrate having one or more catalyst compositions disposed thereon (namely, a catalyst composition comprising molecular sieves as disclosed herein). The term "substrate" refers in general to a monolithic material onto which a catalytic coating is disposed, for example a flow-through monolith or monolithic wall-flow filter. Flow-through and wall-flow substrates are also taught, for example, in International Application Publication No. WO2016/070090, which is incorporated herein by reference.

In one or more embodiments, the substrate is a ceramic or metal having a honeycomb structure. Any suitable substrate may be employed, such as a monolithic substrate of the type having fine, parallel gas flow passages extending from an inlet end to an outlet end of the substrate such that passages are open to fluid flow. The passages, which are essentially straight paths from their fluid inlet to their fluid outlet, are defined by walls on which a catalytic coating is disposed so that gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 900 or more gas inlet openings (i.e. cells) per square inch of cross-section.

Present substrates are 3-dimensional having a length and a diameter and a volume, similar to a cylinder. The shape does not necessarily have to conform to a cylinder. The length is an axial length defined by an inlet end and an outlet end. The presently disclosed coatings may be on the wall surface and/or in the pores of the walls, that is "in" and/or "on" the filter walls. Thus, the phrase "having a catalytic coating thereon" means on any surface, for example on a wall surface and/or on a pore surface.

According to one or more embodiments, the substrate of the catalytic article may be constructed of any material typically used for preparing automotive catalysts and typically comprises a metal or ceramic monolithic honeycomb structure. The substrate (e.g., a wall-flow filter or flow through substrate) typically provides a plurality of wall surfaces upon which washcoats comprising the catalyst compositions described herein are applied and adhered, thereby acting as a carrier for the catalyst compositions.

Exemplary metallic substrates include heat resistant metals and metal alloys, such as titanium and stainless steel as well as other alloys in which iron is a substantial or major component. Specific examples of metallic substrates include the heat-resistant, base-metal alloys, especially those in which iron is a substantial or major component. Such alloys may contain one or more of nickel, chromium, and aluminum, and the total of these metals may advantageously comprise at least about 15 wt. % (weight percent) of the alloy, for instance, about 10 to about 25 wt. % chromium, about 1 to about 8 wt. % of aluminum, and from 0 to about 20 wt. % of nickel. The alloys may also contain small or trace amounts of one or more other metals, such as manganese, copper, vanadium, titanium and the like. The surface of the wall-flow metal substrate may be oxidized at high temperatures, e.g., 1000° C. and higher, to form an oxide layer on the surface of the substrate, improving the corrosion resistance of the alloy and facilitating adhesion of the washcoat layer to the metal surface. Metallic substrates may be employed in various shapes such as pellets, corrugated sheet or monolithic foam.

Ceramic materials used to construct the disclosed substrate may include any suitable refractory material, e.g., cordierite, mullite, cordierite-α alumina, aluminum titanate, silicon carbide, silicon nitride, zircon mullite, spodumene, alumina-silica magnesia, zircon silicate, sillimanite, magnesium silicates, zircon, petalite, a alumina, aluminosilicates and the like. In alternative embodiments, one or more catalyst compositions may be deposited on an open cell foam substrate. Such substrates are well known in the art, and are typically formed of refractory ceramic or metallic materials. Any suitable substrate may be employed, such as a monolithic flow-through substrate having a plurality of fine, parallel gas flow passages extending from an inlet to an outlet face of the substrate such that passages are open to fluid flow. Exemplary monolithic flow-through substrates have, for example, volumes of from about 20 in$^3$ to about 1200 in$^3$. The passages, which are essentially straight paths from the inlet to the outlet, are defined by walls on which the catalytic material is coated as a washcoat so that the gases flowing through the passages contact the catalytic material. The flow passages of the monolithic substrate are thin-walled channels which can be of any suitable cross-sectional shape, such as trapezoidal, rectangular, square, sinusoidal, hexagonal, oval, circular, and the like. Such structures may contain from about 60 to about 1200 or more gas inlet openings (i.e., "cells") per square inch of cross section (cpsi), e.g., about 60 cpsi to about 500 cpsi or to about 900 cpsi, more usually from about 200 to about 400 cpsi or about 300 to about 600 cpsi. The wall thickness of flow-through substrates can vary, with a typical range being between 0.002 and 0.1 inches or about 50 to about 200 microns or about 400 microns. A representative commercially-available flow-through substrate is a cordierite substrate having 400 cpsi and a wall thickness of 6 mil, or 600 cpsi and a wall thickness of 4 mil. However, it will be understood that the invention is not limited to a particular substrate type, material, or geometry.

Figure 1B:
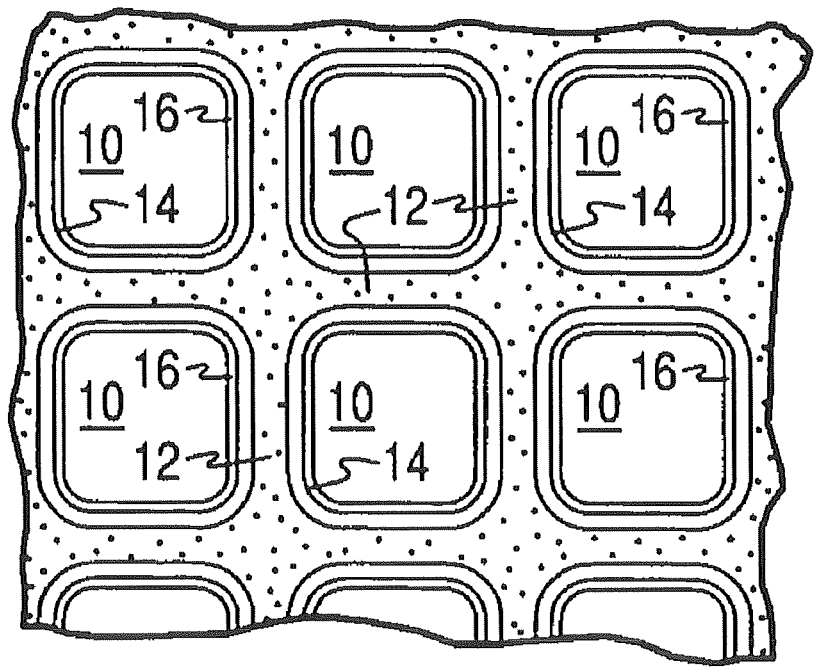

FIGS. 1a and 1b illustrate an exemplary substrate 2 in the form of a flow-through substrate coated with washcoat compositions as described herein. Referring to FIG. 1a, the exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 1b, flow passages 10 are formed by walls 12 and extend through substrate 2 from upstream end face 6 to downstream end face 8, the passages 10 being unobstructed so as to permit the flow of a fluid, e.g., a gas stream, longitudinally through substrate 2 via gas flow passages 10 thereof. As more easily seen in FIG. 1b, walls 12 are so dimensioned and configured that gas flow passages 10 have a substantially regular polygonal shape. As shown, the washcoat compositions can be applied in multiple, distinct layers if desired. In the illustrated embodiment, the washcoats consist of a discrete first washcoat layer 14 adhered to the walls 12 of the substrate member and a second discrete washcoat layer 16 coated over the first washcoat layer 14. The present invention can be practiced with one or more (e.g., 2, 3, or 4) washcoat layers and is not limited to the illustrated two-layer embodiment.

For example, in one embodiment, a catalytic article comprises a catalytic material with multiple layers, wherein each layer has a different composition. The order of the layers of the catalytic material can have a significant impact on to the catalytic activity of the catalytic article. For example, in some embodiments, the first layer (e.g., layer 14 of FIG. 2) comprises a catalyst composition as disclosed herein and the second layer (e.g., layer 16 of FIG. 2) comprises a PGM-containing catalyst composition.

In alternative embodiments, the substrate may be a wall-flow substrate, wherein each passage is blocked at one end of the substrate body with a non-porous plug, with alternate passages blocked at opposite end-faces, producing, e.g., a catalyzed soot filter (CSF). Wall-flow filter substrates useful for supporting the catalytic coatings have a plurality of fine, substantially parallel gas flow passages extending along the longitudinal axis of the substrate. If a wall-flow substrate is utilized, the resulting system will be able to remove particulate matter along with gaseous pollutants. This requires that gas flow through the porous walls of the wall-flow substrate to reach the exit. Such monolithic substrates may contain up to about 700 or more cpsi, such as about 100 to 400 cpsi, about 100 to 300 cpsi, and more typically about 200 to about 300 cpsi. The cross-sectional shape of the cells can vary as described above (with, e.g., cross-sections that are rectangular, square, circular, oval, triangular, hexagonal, or are of other polygonal shapes). Wall-flow substrates typically have a wall thickness between 0.002 and 0.1 inches (e.g., a wall thickness from about 50 microns to about 500 microns, for example from about 150 microns to about 400 microns). Wall-flow filters will generally have a wall porosity of at least 40% with an average pore size of at least 10 microns prior to disposition of a catalytic coating. For instance, wall-flow filters can have a wall porosity of from about 50 to about 75% and an average pore size of from about 10 to about 30 microns prior to disposition of a catalytic coating.

A representative commercially available wall-flow substrate is constructed from a porous cordierite, an example of which has 200 cpsi and 10 mil wall thickness or 300 cpsi with 8 mil wall thickness, and wall porosity between 45-65%. Other ceramic materials such as aluminum-titanate, silicon carbide and silicon nitride are also used as wall-flow filter substrates. However, it will be understood that the invention is not limited to a particular substrate type, material, or geometry. Note that where the substrate is a wall-flow substrate, the catalyst composition can permeate into the pore structure of the porous walls (i.e., partially or fully occluding the pore openings) in addition to being disposed on the surface of the walls. Loading of the catalytic coating on a wall-flow substrate will depend on substrate properties such as porosity and wall thickness and typically will be lower than the catalyst loading on a flow-through substrate.

Figure 1C:
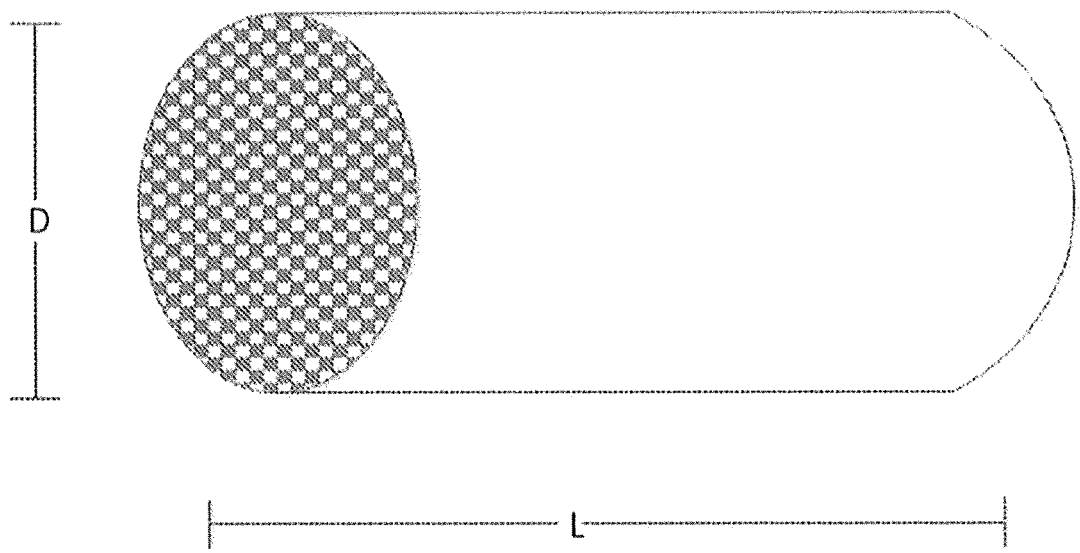
FIG. 1c shows a perspective view of a wall-flow filter substrate.
Figure 1D:
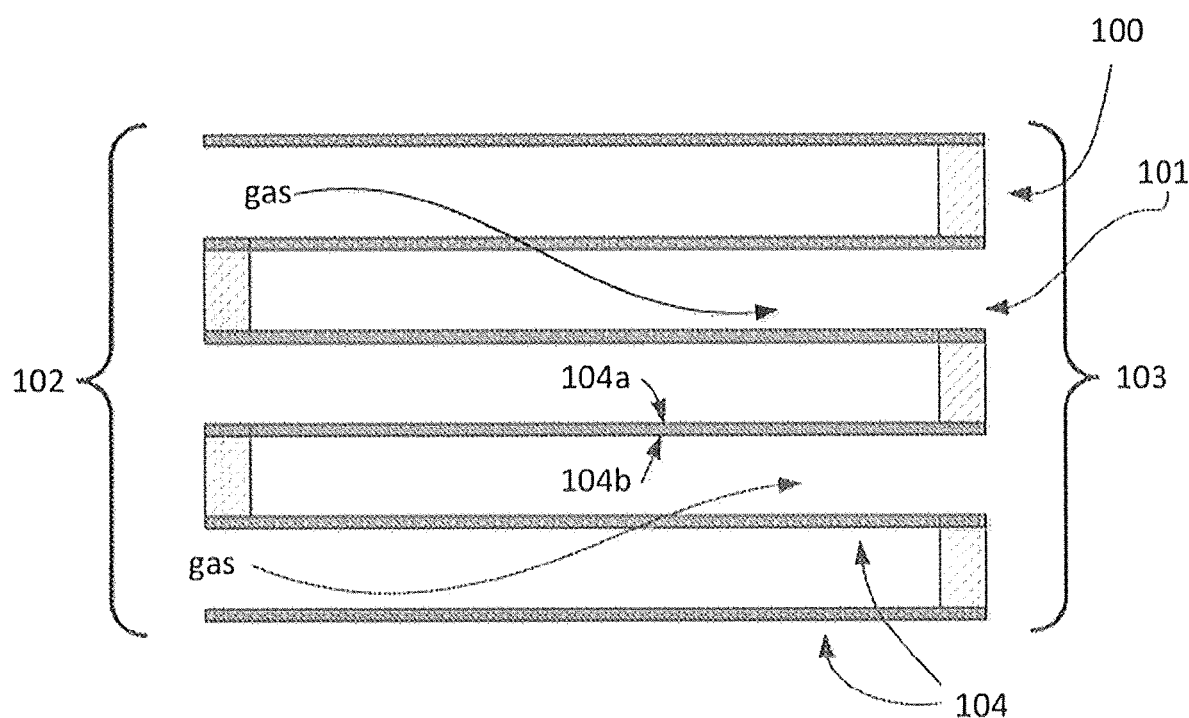
FIG. 1d shows a cross-sectional view of a section of a wall-flow filter substrate.

A wall-flow filter and wall-flow filter section are shown in FIGS. 1c and 1d respectively. The wall-flow filter shown in FIG. 1c has an axial length L and diameter D. The alternating blocked ("plugged") passages are seen in the checkerboard face pattern in FIG. 1c. Alternating plugged and open passages (cells) are seen in the cross-section view of a section of a wall-flow filter in FIG. 1d. Blocked or plugged ends 100 alternate with open passages 101, with each opposing end open and blocked, respectively. The filter has an inlet end 102 and outlet end 103. The arrows crossing porous cell walls 104 represent exhaust gas flow entering the open cell ends, diffusion through the porous cell walls 104 and exiting the open outlet cell ends. Plugged ends 100 prevent gas flow and encourage diffusion through the cell walls. Each cell wall will have an inlet side 104a and outlet side 104b. The passages are enclosed by the cell walls. The dark squares in FIG. 1c are plugged ends 100 and white squares are open ends 101.

Catalyzed wall-flow filters are disclosed, for instance, in U.S. Pat. No. 7,229,597, which is incorporated herein by reference. This reference teaches a method of applying a catalytic coating such that the coating permeates the porous walls, that is, is dispersed throughout the walls. Catalytic materials may be present on the inlet side of the element wall alone, the outlet side alone, both the inlet and outlet sides, or the wall itself may consist all, or in part, of the catalytic material. This invention includes the use of one or more layers of catalytic material on the inlet and/or outlet walls of the element.

Advantageously, the catalyst composition disclosed herein is present in a multi-layer catalytic coating. For example, the Pd and ceria molecular sieve composition is advantageously present in a bottom coating layer over a substrate. Advantageously, a top coating layer is present over the bottom coating layer, the top coating layer comprising, for example, the PGM composition as referenced herein above. In some embodiments, a bottom coating layer may comprise a PGM composition as described herein.

Catalytic layers may further comprise any one or combinations of the oxides of lanthanum, barium, praseodymium, neodymium, samarium, strontium, calcium, magnesium, niobium, hafnium, gadolinium, manganese, iron, tin, zinc or copper.

The catalytic coating comprises, for example, a top layer and a bottom layer. The coating is disposed on and in adherence to the substrate. The entire coating comprises the individual "coating layers". Any one layer may extend the entire axial length of the substrate, for instance a bottom layer may extend the entire axial length of the substrate and a top layer may also extend the entire axial length of the substrate over the bottom layer.

Alternatively, a top layer may overlay a portion of a bottom layer. For example, a bottom layer may extend the entire length of the substrate and the top layer may extend about 10%, about 20%, about 30%, about 40%, about 50%, about 60%, about 70%, about 80% or about 90% of the substrate length, from either the inlet or outlet end.

Alternatively, a bottom layer may extend about 10%, about 15%, about 25%, about 30%, about 40%, about 45%, about 50%, about 55%, about 60%, about 65%, about 70%, about 75%, about 80%, about 85% or about 95% of the substrate length from either the inlet end or outlet end and a top layer may extend about 10%, about 15%, about 25%, about 30%, about 40%, about 45%, about 50%, about 55%, about 60%, about 65%, about 70%, about 75%, about 80%, about 85% or about 95% of the substrate length from either the inlet end of outlet end, wherein at least a portion of the top layer overlays the bottom layer. This "overlaid" zone may for example extend from about 5% to about 80% of the substrate length, for example about 5%, about 10%, about 20%, about 30%, about 40%, about 50%, about 60% or about 70% of the substrate length.

For example, both bottom and top coating layers may extend from the same substrate end where the top layer partially or completely overlays the bottom layer and where the bottom layer extends a partial or full length of the substrate and where the top layer extends a partial or full length of the substrate. Likewise, bottom and top coating layers may extend from opposite ends of the substrate, where the top layer partially or completely overlays the bottom layer and where the bottom layer extends a partial or full length of the substrate and where the top layer extends a partial or full length of the substrate. Each of the top and bottom layers may extend from either the inlet or outlet end.

Top and/or bottom coating layers may be in direct contact with the substrate. Alternatively, one or more "undercoats" may be present, so that at least a portion of the top and/or the bottom coating layers are not in direct contact with the substrate (but rather with the undercoat). One or more "overcoats" may also be present, so that at least a portion of the top and/or bottom coating layers are not directly exposed to a gaseous stream or atmosphere (but rather are in contact with the overcoat).

The top and bottom coating layers may be in direct contact with each other without any layer in-between or "interlayer". An interlayer, if present, may prevent the top and bottom layers from being in direct contact. An interlayer may partially prevent the top and bottom layers from being in direct contact and thereby allow for partial direct contact between the top and bottom layers.

An undercoat is a layer "under" a coating layer, an overcoat is a layer "over" a coating layer and an interlayer is a layer "between" two coating layers. The terms "on" and "over" in reference to a coating layer may be used synonymously. The term "directly on" means in direct contact with. The interlayer(s), undercoat(s) and overcoat(s) may contain one or more catalysts or may be free of catalysts.

The present catalytic coatings may comprise more than one identical layers, for instance more than one layer containing identical catalyst compositions.

Figure 2A:
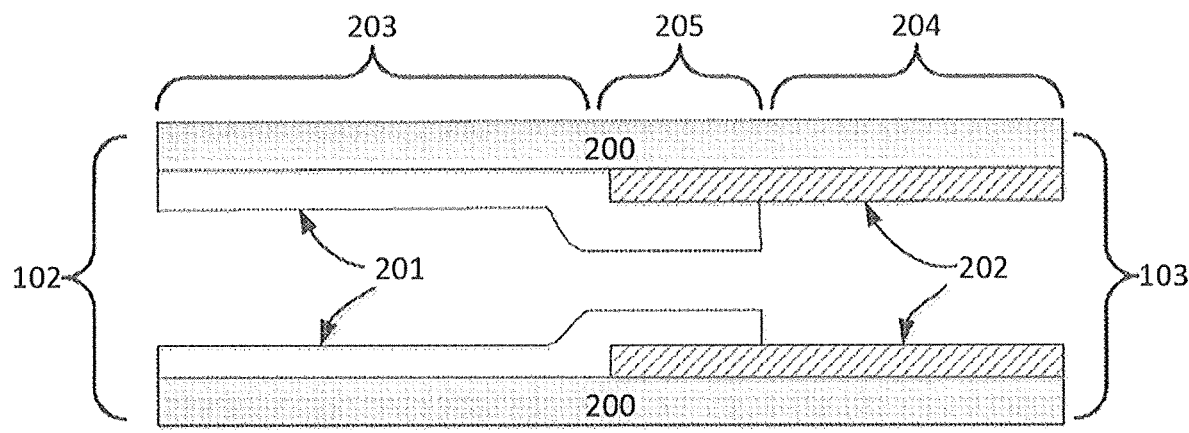
FIGS. 2a and 2b show two possible coating configurations.
Figure 2B:
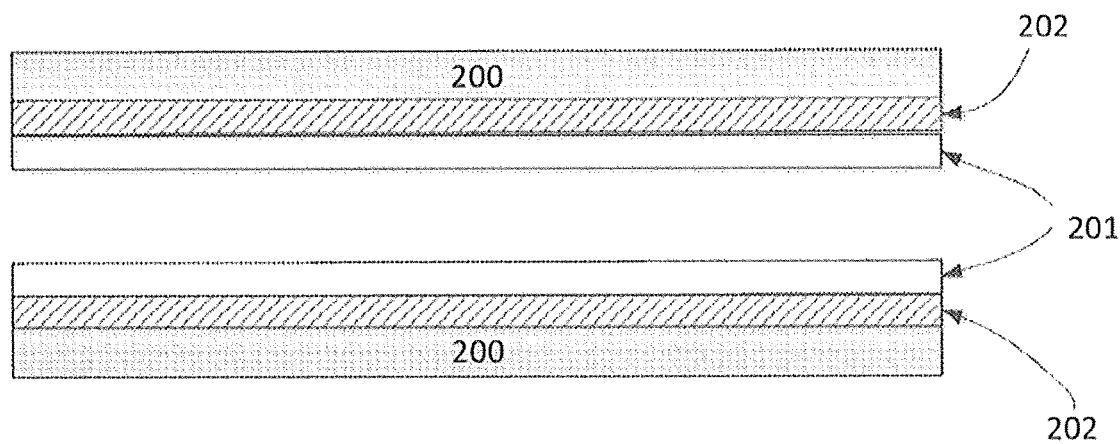

FIGS. 2a and 2b show some possible coating layer configurations with two coating layers. Shown are substrate walls 200 onto which coating layers 201 (top coat) and 202 (bottom coat) are disposed. This is a simplified illustration, and in the case of a porous wall-flow substrate, not shown are pores and coatings in adherence to pore walls and not shown are plugged ends. In FIG. 2a, bottom coating layer 202 extends from the outlet about 50% of the substrate length and top coating layer 201 extends from the inlet greater than 50% of the length and overlays a portion of layer 202, providing an upstream zone 203, a middle zone 205 and a downstream zone 204. In FIG. 2b, coating layers 201 and 202 each extend the entire length of the substrate with top layer 201 overlaying bottom layer 202. The substrate of FIG. 2b does not contain a zoned coating configuration. FIGS. 2a and 2b may be useful to illustrate coating compositions on the wall-through substrate or the flow-through substrate.

The present catalytic coating, as well as any zone or any layer or any section of a coating, is present on the substrate at a loading (concentration) of for instance from about 0.3 g/in$^3$ to about 6.0 g/in$^3$, or from about 0.4, about 0.5, about 0.6, about 0.7, about 0.8, about 0.9 or about 1.0 g/in$^3$ to about 1.5 g/in$^3$, about 2.0 g/in$^3$, about 2.5 g/in$^3$, about 3.0 g/in$^3$, about 3.5 g/in$^3$, about 4.0 g/in$^3$, about 4.5 g/in$^3$, about 5.0 g/in$^3$ or about 5.5 g/in$^3$ based on the substrate. This refers to dry solids weight per volume of substrate, for example per volume of a honeycomb monolith. Concentration is based on a cross-section of a substrate or on an entire substrate.

In some embodiments, a top coating layer is present at a lower loading than the bottom coating layer. In some embodiments, a bottom layer contains little or no refractory metal oxide support, that is, the bottom layer is substantially free of refractory metal oxide support. In some embodiments, a top layer contains little or no molecular sieves, that is, the top layer is substantially free of molecular sieves.

The present catalyst compositions can be used alone, or together with (e.g., in admixture with) one or more additional catalyst compositions.

Catalysts used to treat the exhaust of internal combustion engines are less effective during periods of relatively low temperature operation, such as the initial cold-start period of engine operation, because the engine exhaust is not at a temperature sufficiently high for efficient catalytic conversion of noxious components in the exhaust. To this end, an adsorbent material, which may be a molecular sieve, for example a zeolite, may be provided as part of a catalyst composition in order to adsorb gaseous pollutants, usually hydrocarbons, and retain them during the initial cold-start period. As the exhaust gas temperature increases, the adsorbed hydrocarbons are driven from the adsorbent and subjected to catalytic treatment at the higher temperature.

The present catalytic articles are advantageously at least substantially sulfur-resistant and, as such, high temperature desulfation processes can be performed repeatedly without damaging the catalytic coating.

Method of Making the Catalyst Articles

Catalyst compositions are typically prepared in the form of catalyst particles as noted above. These catalyst particles can be mixed with water to form a slurry for purposes of coating a substrate, such as a honeycomb-type substrate. A catalytic coating contains one or more carriers containing active catalytic species. A catalytic coating may typically be applied in the form of a washcoat containing carriers having catalytically active species thereon. A washcoat is formed by preparing a slurry containing a specified solids content (e.g., 10-60% by weight) of carriers in a liquid vehicle, which is then coated onto a substrate and dried and calcined to provide a coating layer. When multiple coating layers are applied, the substrate is dried and calcined after each layer is applied and/or after the number of desired multiple layers are applied.

In addition to the catalyst particles, the slurry may optionally contain a binder in the form of alumina, ceria, silica, Zr acetate, colloidal zirconia, or Zr hydroxide, associative thickeners, and/or surfactants (including anionic, cationic, non-ionic or amphoteric surfactants). For example, a molecular sieve-containing coating can be prepared using a binder such as a $ZrO_2$ binder derived from a suitable precursor such as zirconyl acetate or any other suitable zirconium precursor such as zirconyl nitrate. A zirconyl acetate binder, for example, provides a catalytic coating that can, in some embodiments, remain homogeneous and intact after thermal aging, for example, when the catalyst is exposed to high temperatures of at least about 600° C., e.g., about 800° C. and higher, and high water vapor environments of about 10% or more. Alumina binders include aluminum oxides, aluminum hydroxides, and aluminum oxyhydroxides. Aluminum salts and colloidal forms of alumina many also be used. Silica binders include various forms of $SiO_2$, including colloidal silica. Binder compositions may include any combination of the foregoing. Other exemplary binders include boehemite, gamma-alumina, or delta/theta alumina, as well as silica sol. When present, the binder is typically used in an amount of about 1-5 wt. % of the total washcoat loading. Addition of acidic or basic species to the slurry can be carried out to adjust the pH accordingly. For example, in some embodiments, the pH of the slurry is adjusted by the addition of ammonium hydroxide or aqueous nitric acid. A typical pH range for the slurry is about 3 to 6.

The slurry can be milled to reduce the particle size and enhance particle mixing. The milling can be accomplished in a ball mill, continuous mill, or other similar equipment, and the solids content of the slurry may be, e.g., about 20-60 wt. %, more particularly about 20-40 wt. %. In one embodiment, the post-milling slurry is characterized by a D90 particle size of about 10 to about 40 microns, preferably 10 to about 30 microns, more preferably about 10 to about 15 microns. The D90 is determined using a dedicated particle size analyzer. The equipment was manufactured by Sympatec in 2010 and uses laser diffraction to measure particle sizes in small volume slurry. The D90, typically with units of microns, means 90% of the particles by number have a diameter less than a quoted value.

The slurry is coated on the substrate using any washcoat technique known in the art. In one embodiment, the substrate is dipped one or more times in the slurry or otherwise coated with the slurry. Thereafter, the coated substrate is dried at an elevated temperature (e.g., 100-150° C.) for a period of time (e.g., 10 min to about 3 hours) and then calcined by heating, e.g., at 400-600° C., typically for about 10 minutes to about 3 hours. Following drying and calcining, the final washcoat coating layer can be viewed as essentially solvent-free.

After calcining, the catalyst loading obtained by the above described washcoat technique can be determined through calculation of the difference in coated and uncoated weights of the substrate. As will be apparent to those of skill in the art, the catalyst loading can be modified by altering the slurry rheology. In addition, the coating/drying/calcining process to generate a washcoat can be repeated as needed to build the coating to the desired loading level or thickness, meaning more than one washcoat may be applied. The catalyst compositions can be applied in multiple layers with each layer having a different composition as explained above (e.g., layers 14 and 16 of FIG. 1*a*)

In particular, the molecular sieves of the Pd and ceria molecular sieve composition may be provided in the form of a powder or a spray-dried material is admixed with or coated with suitable modifiers, e.g., silica, alumina, titania, zirconia and refractory metal oxide binders (for example, a $ZrO_2$ binder derived from a suitable precursor such as zirconyl acetate or any other suitable zirconium precursor such as zirconyl nitrate). The powder or the sprayed material, optionally after admixing or coating by suitable modifiers, may be formed into a slurry, for example with water, which is deposited upon the substrate as disclosed for example in U.S. Pat. No. 8,404,203 to Bull et al., which is incorporated herein by reference.

The catalyst composition may be present from about 0.05 $g/in^3$, about 0.1 $g/in^3$, about 0.2 $g/in^3$, about 0.3 $g/in^3$, about 0.4 $g/in^3$, about 0.5 $g/in^3$, about 0.6 $g/in^3$, about 0.7 $g/in^3$, about 0.8 $g/in^3$, about 0.9 $g/in^3$, about 1.0 $g/in^3$, about 1.2 $g/in^3$, about 1.6 $g/in^3$, about 2.0 $g/in^3$, about 2.2 $g/in^3$ or about 2.5 $g/in^3$ to about 2.8 $g/in^3$, about 3.0 $g/in^3$, about 3.2 $g/in^3$, about 3.5 $g/in^3$, about 3.8 $g/in^3$, about 4.0 $g/in^3$, about 4.5 $g/in^3$, about 5.0 $g/in^3$, about 5.5 $g/in^3$, about 6.0 $g/in^3$, about 6.5 $g/in^3$ or about 7.0 $g/in^3$, based on the volume of the substrate.

Emission Treatment Systems

The present invention also provides an emission treatment system that incorporates the catalytic article described herein, such as an emission treatment system generally comprising an engine producing an exhaust gas stream and a catalytic article of the invention positioned downstream from the engine in fluid communication with the exhaust gas stream. The engine can be, e.g., a diesel engine which operates at combustion conditions with air in excess of that required for stoichiometric combustion, i.e. lean conditions. In other embodiments, the engine can be an engine associated with a stationary source (e.g., electricity generators or pumping stations). In some embodiments, the emission treatment system further comprises one or more additional catalytic components. The relative placement of the various catalytic components present within the emission treatment system can vary.

Systems of the present disclosure can contain, for example, a diesel oxidation catalyst (DOC) and one or more articles containing a reductant injector, a selective catalytic reduction catalyst (SCR), a soot filter, an ammonia oxidation catalyst (AMOx) or a lean NOx trap (LNT). An article containing a reductant injector is a reduction article. A reduction system includes a reductant injector and/or a pump and/or a reservoir, etc. The present treatment system may further comprise a selective catalytic reduction catalyst and/or a soot filter and/or an ammonia oxidation catalyst. A soot filter may be uncatalyzed or may be catalyzed (CSF). For instance, in one embodiment, the disclosure provides an emission treatment system comprising, from upstream to downstream—an article containing a DOC, a CSF, a urea injector, a SCR article and an article containing an AMOx. A lean NOx trap (LNT) may also optionally be included.

The articles "a" and "an" herein refer to one or to more than one (e.g. at least one) of the grammatical object. Any ranges cited herein are inclusive. The term "about" used throughout is used to describe and account for small fluctuations. For instance, "about" may mean the numeric value may be modified by ±5%, ±4%, ±3%, ±2%, ±1%, ±0.5%, ±0.4%, ±0.3%, ±0.2%, ±0.1% or ±0.05%. All numeric values are modified by the term "about" whether or not explicitly indicated. Numeric values modified by the term "about" include the specific identified value. For example, "about 5.0" includes 5.0.

Unless otherwise indicated, all parts and percentages are by weight. Weight percent (wt. %), if not otherwise indicated, is based on an entire composition free of any volatiles, that is, based on dry solids content. All U.S. patent applications, published patent applications and patents referred to herein are hereby incorporated by reference.

EXPERIMENTAL

Example 1: Catalyst Powder Samples

Powder Sample 1: Pd on Zeolite

A standard H⁺-form chabazite was impregnated with Pd nitrate solution (19.8 wt. %) using an incipient wetness procedure. The targeted Pd concentration was 2 weight percent based on the weight of Pd chabazite.

The Pd impregnated zeolite was mixed with deionized water to form a slurry with a targeted solid content of 30 weight percent. The pH of the slurry was reduced to 4 to 4.5 by addition of nitric acid. The slurry was then milled to a particle size of $D_{90}$ less than 15 μm using a ball mill. The milled slurry was dried under stirring for 120 hours and calcined at 500° C. for 2 hours in air. The calcined sample was cooled in air until it reaches room temperature. The calcined powder was crushed and sieved to a particle size of 250-500 μm.

Powder Sample 2: Pd on Ceria

A high surface area ceria (>100 $m^2/g$) was impregnated with a Pd nitrate solution (19.8 wt. %) using a standard incipient wetness procedure. The targeted Pd concentration of the zeolite was 2 weight percent based on the total composition.

The Pd impregnated ceria was mixed with deionized water to form a slurry with a targeted solid content of 30 weight percent. The pH of the slurry was reduced to 4 to 4.5 by addition of nitric acid. The slurry was then milled to a particle size of $D_{90}$ less than 15 μm using a ball mill. The milled slurry was dried under stirring for 120 hours and calcined at 500° C. for 2 hours in air. The calcined sample is cooled in air until it reaches room temperature. The calcined powder was crushed and sieved to a particle size of 250-500 μm.

Powder Sample 3: Pd on Ceria/Chabazite

A standard H⁺-form chabazite was impregnated with a cerium nitrate solution to a targeted ceria loading at 10% using a standard incipient wetness procedure. After drying at 500° C. for one hour, Pd was impregnated to a targeted Pd concentration of 2 weight percent of the coated support using standard incipient wetness procedure.

The Pd impregnated Ce/zeolite was mixed with deionized water to form a slurry with a targeted solid content of 30 weight percent. The pH of the slurry was reduced to 4 to 4.5 by addition of nitric acid. The slurry was then milled to a particle size with $D_{90}$ less than 15 μm using a ball mill. The milled slurry was dried under stirring for 120 hours and calcined at 500° C. for 2 hours in air. The calcined sample was cooled in air until room temperature. This was sample 3. The calcined powder was crushed and sieved to a particle size of 250-500 μm.

Powder Sample 4: Pd on Ceria/ZSM-5

Powder Sample 3 was repeated, changing the zeolite from the small pore-opening 8-member ring chabazite to a medium size pore-opening 10-member ring H-ZSM-5.

Powder Sample 5: Pd on Ceria/Beta

Powder Sample 3 was repeated, changing the zeolite from the small pore-opening 8-member ring chabazite to a large size pore-opening 12-member ring H-beta.

Powder Sample 6: Pd on 20% Ceria/Beta

Powder Sample 5 was repeated, where the ceria loading was increased from 10 wt. % to 20 wt. %.

Powder Sample 7: Pd on 10% Ceria/3% Cu-Chabazite

Powder Sample 3 was repeated, where the chabazite contained 3% ion-exchanged Cu.

Powder Samples 1-7 are summarized below (all contain 2 wt. % Pd).

| Powder sample | base metal concentration (wt. %) | zeolite |
| --- | --- | --- |
| 1 | — | chabazite |
| 2 | ceria (100) | — |
| 3 | ceria (10) | chabazite |
| 4 | ceria (10) | ZSM-5 |
| 5 | ceria (10) | Beta |
| 6 | ceria (20) | Beta |
| 7 | ceria (10)/Cu (3) | chabazite |

Powder Sample Catalytic Activity

Performance of the powder catalysts was measured using a 48-fold high-throughput powder test unit. The powder catalysts with particle sizes of 250-500 μm were tested for their CO and HC oxidation performance using a feed gas containing 700 ppm CO, 420 ppm HC (mixture of 80 ppm propene, 340 ppm decane/toluene with 2/1 as C1 ratio), 70 ppm NO, 10 volume % $O_2$, 10 vol. % $CO_2$ and 5 volume % water (balance $N_2$). GHSV was 45,000 $h^{-1}$. Steady state tests in a temperature range of 125 to 350° C. were carried out by passing the gas mixture through each of the 48 reactors. At each temperature and for each reactor the measurement time included a 3 minute equilibration time plus a 30 second sampling time.

As a measure of the performance of fresh and aged catalysts the CO (T50_CO) and HC (T70_HC) light-off temperatures were determined. Aged conditions were 20 hours at 800° C. in 10% steam/air.

Figure 3:
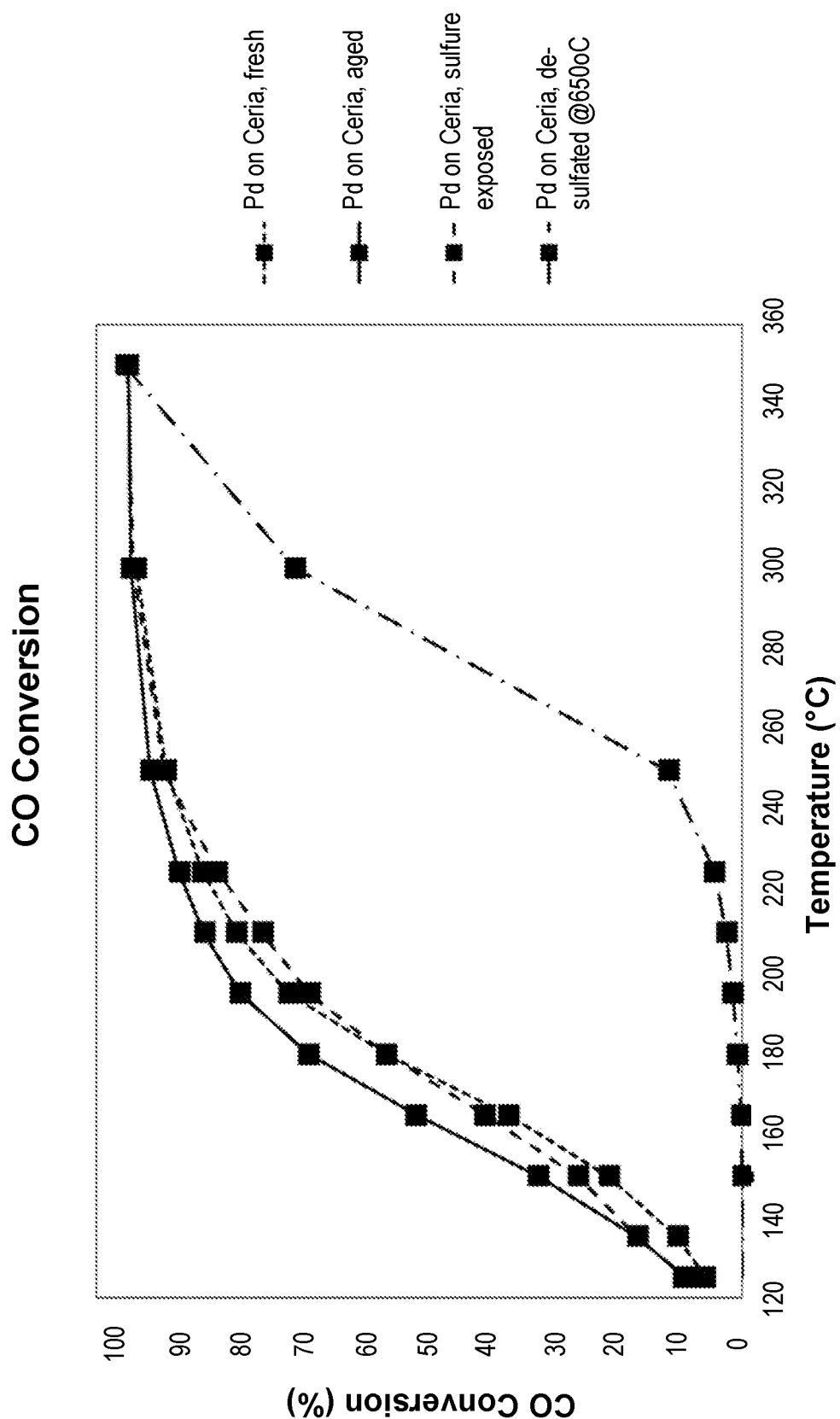

FIG. 3 shows that Pd on ceria powder provided a good catalyst for low temperature CO oxidation. However, it suffered deterioration after sulfur exposure, especially after further high temperature excursions. There has been very little success, if any, in preventing such deterioration. The present invention discloses a way of minimizing the deterioration by incorporating a sulfur resistant support, such as a small pore zeolite such as a chabazite.

Figure 4:
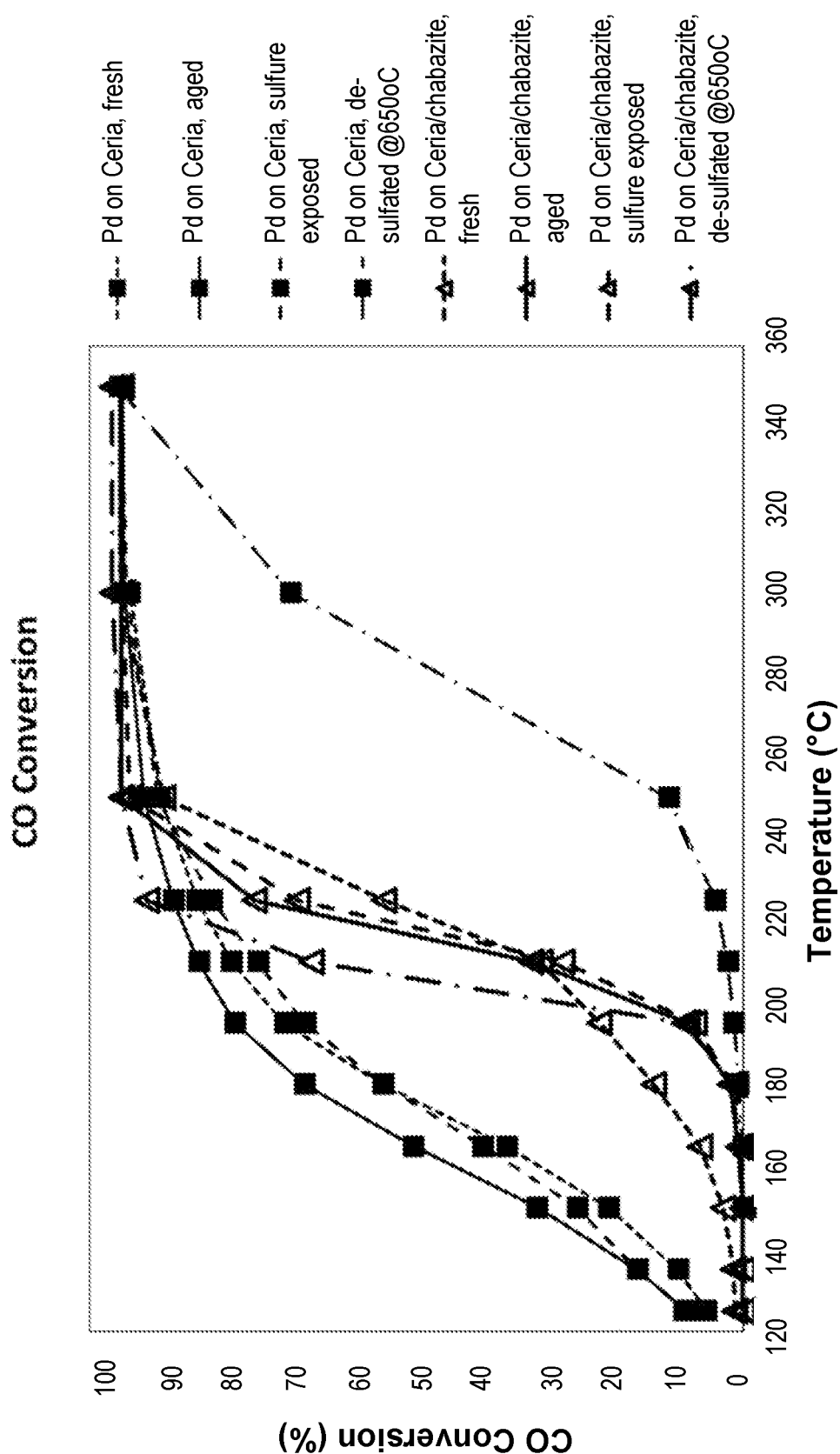
Figure 6:
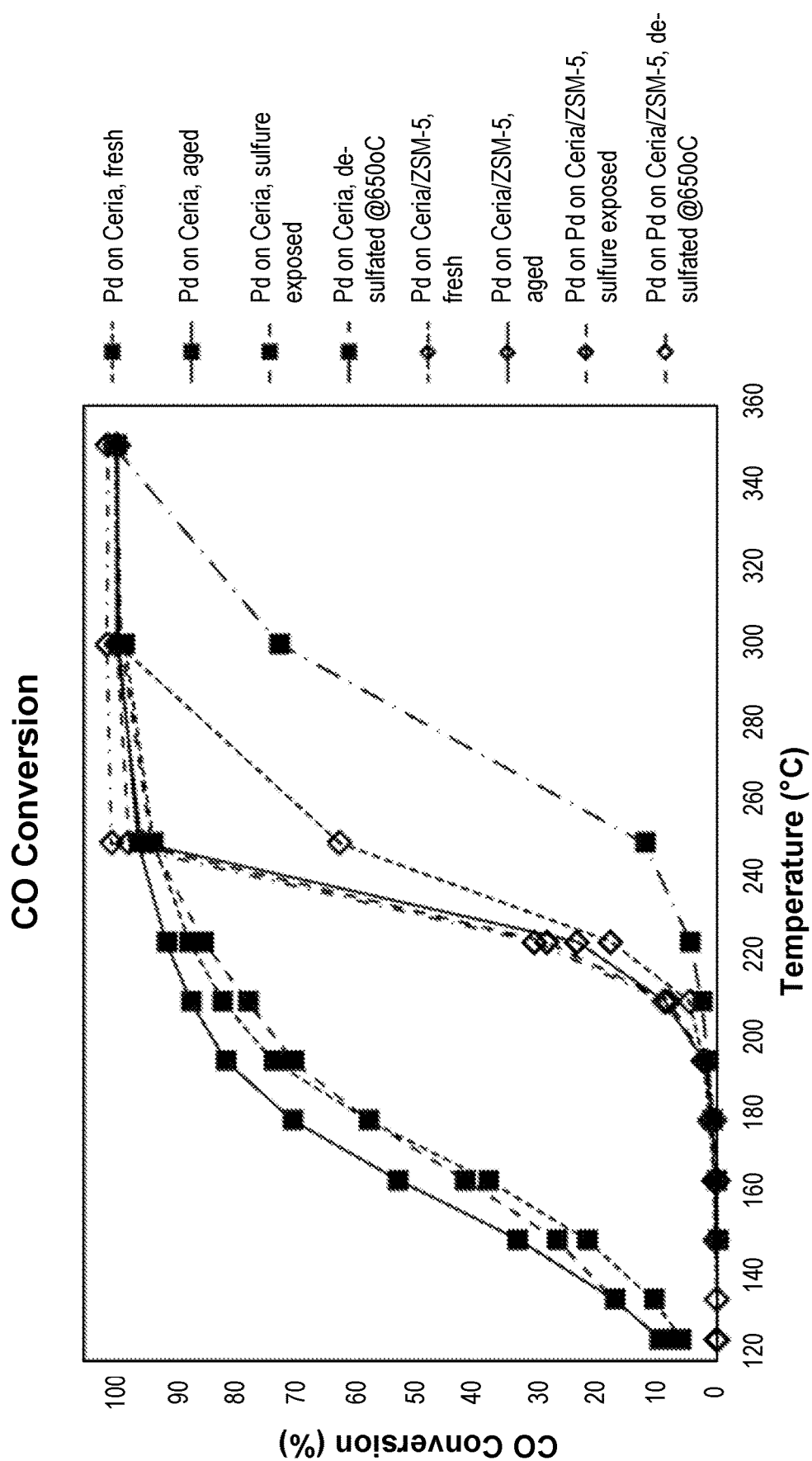

FIG. 4, containing light-off results, clearly shows that the Pd/Ce/CHA powders offer unique characteristics against sulfur poisoning observed in Pd/Ce compounds. Instead of deterioration, the de-sulfuring procedure enhanced the CO light-off performance. Similarly, other small to medium pore-opening zeolites also offered such unique properties. For example, the comparison of CHA and ZSM-5, in FIG. 6, shows that ZSM-5, a 10-member ring medium pore opening zeolite, offered similar sulfur resistance as CHA.

Figure 5:
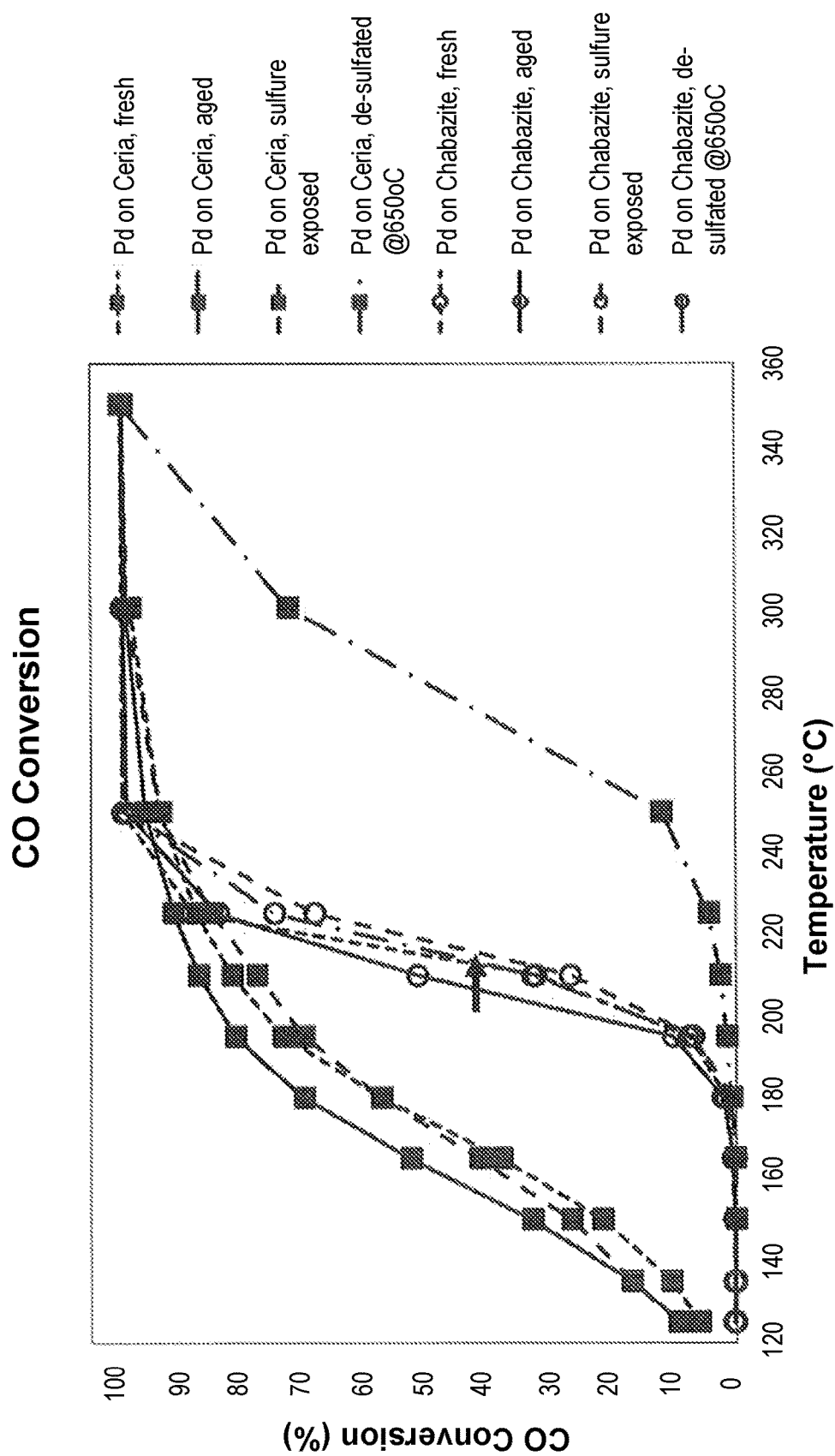

FIG. 5, containing light-off results, provided a comparison between the Pd on ceria powder and Pd/CHA powders with respect to CO light-off before and after sulfur exposure. Both the Pd/CHA powder and the Pd on ceria powder showed an incomplete recovery of CO light-off performance after sulfation and desulfation.

Figure 7:
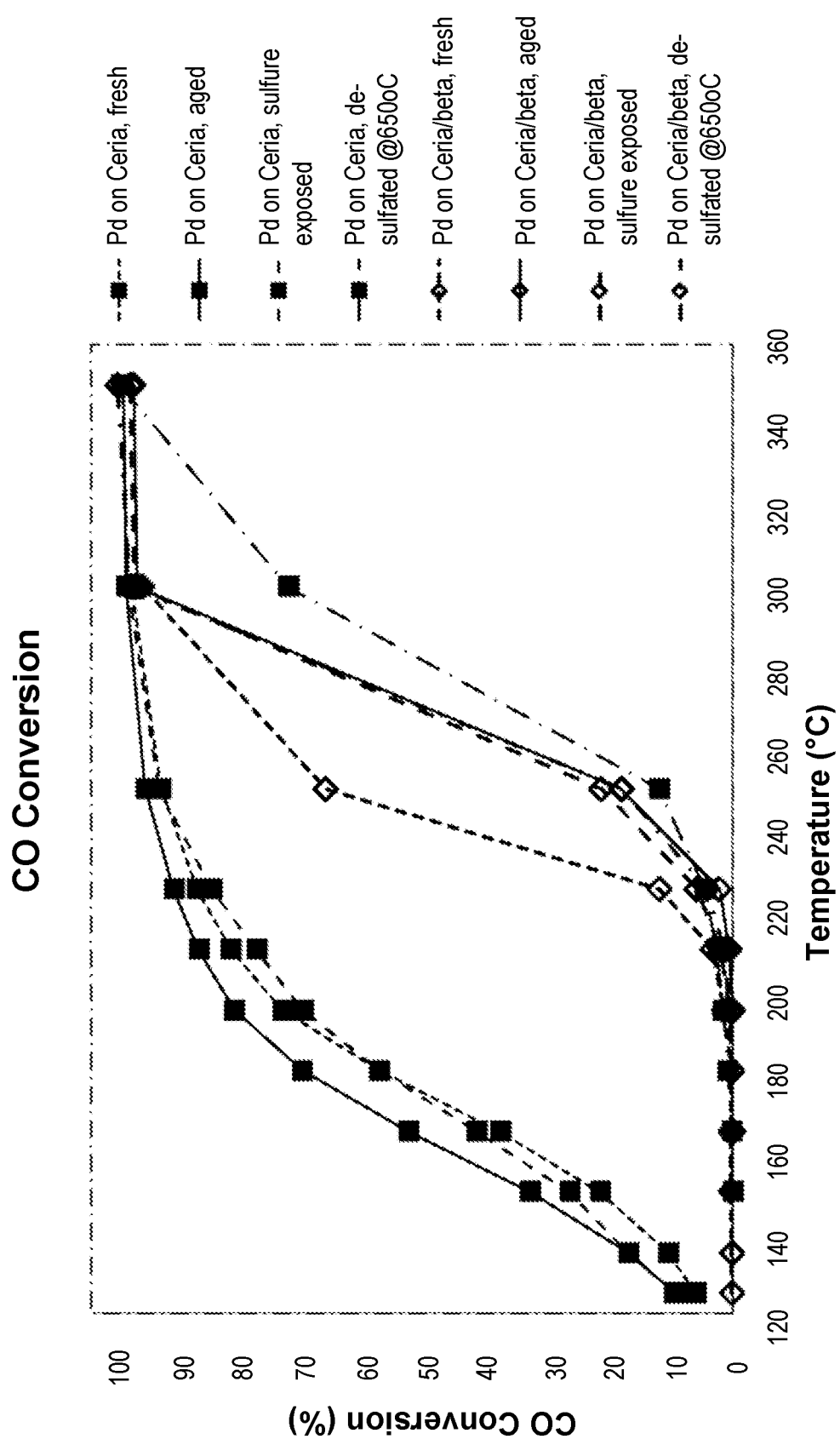

FIG. 7 shows that the use of a large pore-opening zeolite, such as beta, did not yield the needed CO light-off performance, even though sulfur has a minimum impact on the aged catalyst performance. Desulfation at 650° C. did not further degrade performance.

Figure 8:
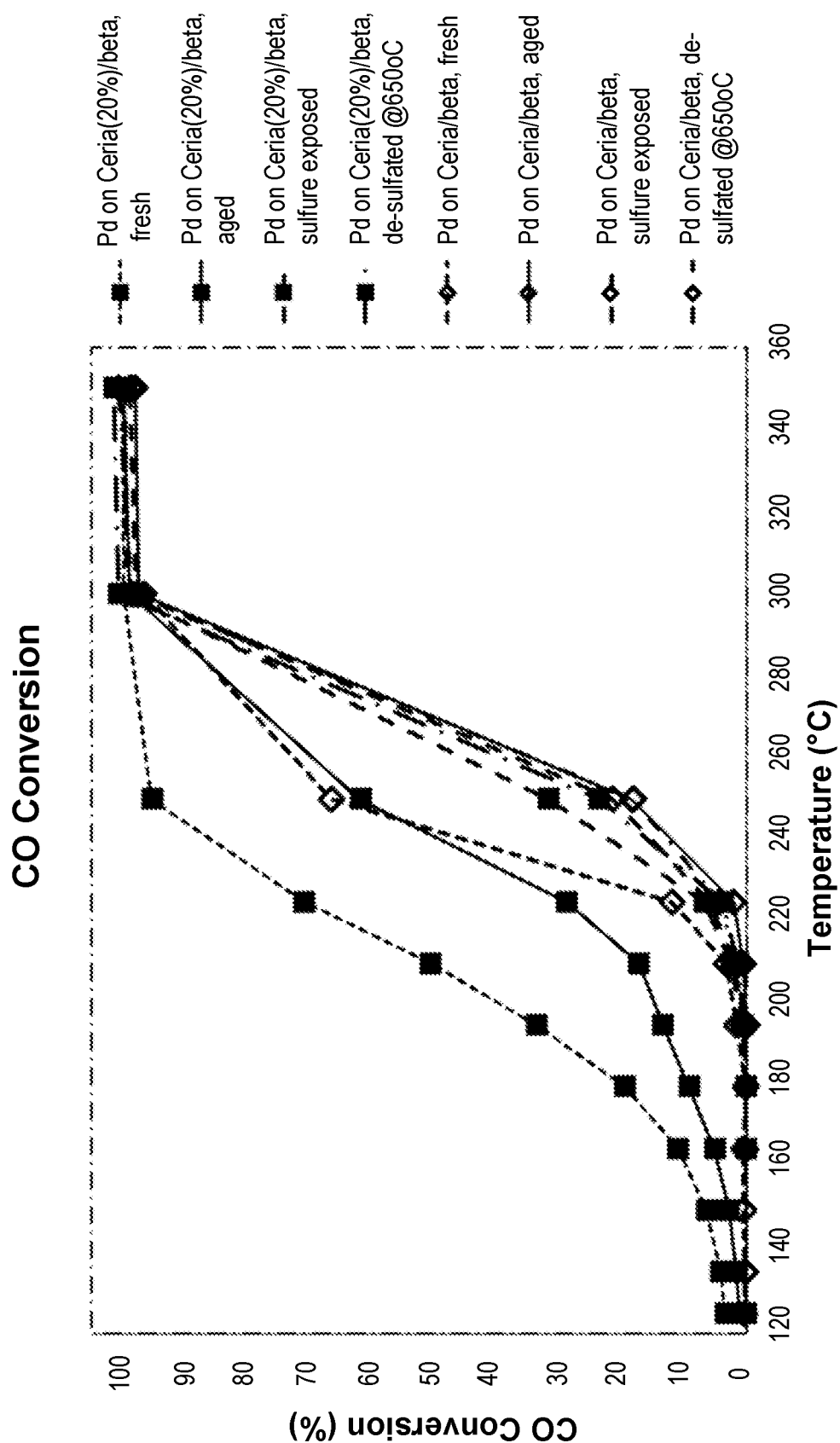

Increasing ceria content from 10% to 20%, shown in FIG. 8, enhanced fresh CO light-off performance. However, it deteriorated after sulfur exposure and did not recover after desulfation.

Figure 9:
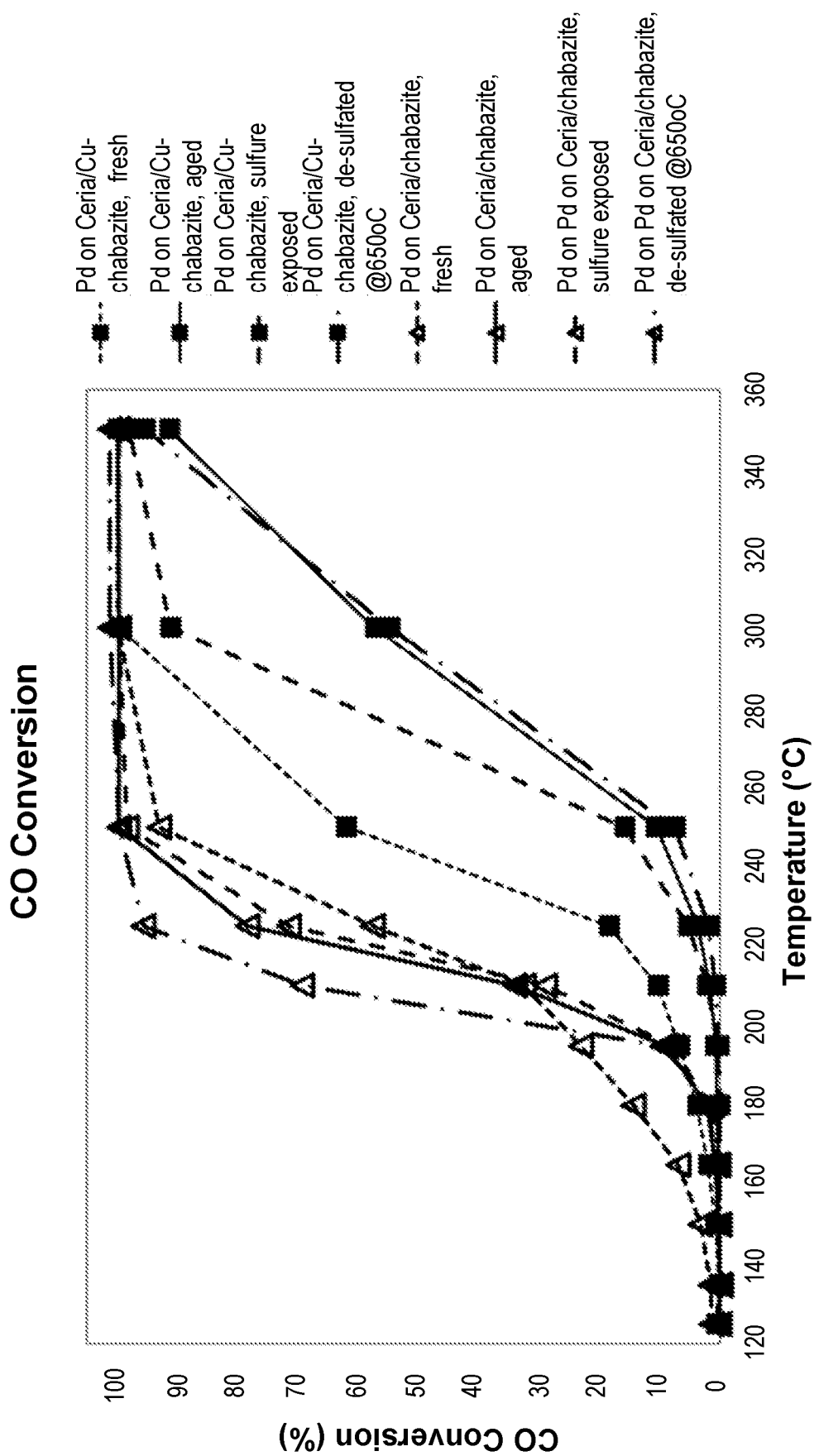
FIG. 9 shows a comparison of Pd/Ce/CHA powder sample 3 vs. Pd/Ce/CuCHA powder sample 7 performance, after desulfation at 650° C.

As CuCHA is a very good SCR catalyst, a test was conducted using this catalyst as the support for the Pd/Ce catalyst. CO light-off results, shown in FIG. 9, indicate that Cu compromised the light-off performance.

Example 2: Catalytic Coatings

Coated honeycomb cores were prepared. The honeycomb core employed had a cell density of about 400 cells per square inch and was 3" in length and 1" diameter.

Comparative Coating 1: Two-Layer Catalytic Coating Composition

A bottom coating layer comprising Pd and Pt was prepared. Pd nitrate solution was impregnated onto alumina powder. Barium hydroxide was added to this impregnated powder. The powder was provided as a slurry in water. Pt-amine solution was added to the slurry and the pH was adjusted to 4.5-5 with dilute nitric acid. The slurry was milled to provide a washcoat slurry having a 38-40% solid concentration and a particle size distribution at a $D_{90}$ of about 20 microns.

The washcoat slurry was applied to a honeycomb core to form a bottom coating layer. The coated core was dried at 120° C. for four hours and calcined at 500° C. for 1 hour. The resulting core had a precious metal loading of 22 g/ft³ with a Pt/Pd ratio about 3:4.

The top coat was prepared by adding Mn-containing alumina (5 wt. % Mn) to de-ionized water to form a slurry as disclosed in U.S. Pat. Appl. Pub. No. 2015/0165422, which is incorporated herein by reference. A Pt-amine solution was added to the slurry. Dilute nitric acid was added to the slurry to lower the pH to from 4.5-5. The slurry was milled to form a washcoat slurry having a particle size of a $D_{90}$ of about 20 microns. H-beta powder was added to the milled slurry. After blending, the final washcoat had a solid concentration about 38%.

The washcoat was applied to the above bottom layer-coated honeycomb core. The coated core was dried at 120° C. for four hours and calcined at 500° C. for 1 hour, resulting in a final catalyst formulation with an additional 28 g/ft³ of Pt. The total catalytic coating loading was about 2.5 g/in³ of which 0.35 g/in³ is zeolite beta. The coating had a PGM loading of 50 g/ft³ and a Pt/Pd ratio of 3/1.

Comparative Coating 2: Three-Layer Catalytic Coating Composition

A non-PGM bottom coating layer was prepared. A washcoat slurry was prepared with a Ce—Al powder (50/50 wt.

%) and alumina and with zirconium acetate binder. The washcoat was applied to a honeycomb core. The coated core sample was dried at 120° C. for four hours and calcined at 500° C. for 1 hour, resulting in coating loading of about 1.5 g/in$^3$.

A second layer (middle coat) comprising Pt/Pd was prepared. Pd nitrate was impregnated onto Mn-coated alumina (5 wt. % Mn). The impregnated powder was stabilized with barium hydroxide and added to a colloidal Pt liquid. This slurry was milled to provide a washcoat slurry having a solid concentration about 37% and a $D_{90}$ of about 20 microns.

The washcoat slurry was applied to the coated honeycomb core. The core sample was dried at 120° C. for four hours and calcined at 500° C. for 1 hour. The resulting core had a PGM loading of 35.6 g/ft$^3$, with a Pt/Pd distribution 20:15.6 and a coating loading of 1.8 g/in$^3$.

A top coating layer comprising Pt/Pd layer was prepared. Similar to the middle coat, Pd nitrate was impregnated onto Mn-coated alumina (5 wt. % Mn). The impregnated powder was stabilized with barium hydroxide and added into a colloidal Pt liquid as disclosed in U.S. Pub. No. 2014/0044627. The slurry was milled and zeolite beta was added to provide a washcoat slurry having a solid concentration about 35% and a $D_{90}$ of between 15-20 microns, washcoat slurry.

The washcoat was applied to the core having the bottom and middle coats. The coated core was dried at 120° C. for four hours and calcined at 500° C. for 1 hour. The resulting core had a PGM loading of 16.3 g/ft$^3$ with a Pt/Pd distribution of 14.6:1.7 and a top catalytic coating loading of 1.1 g/in$^3$ of which 0.35 g/in$^3$ was zeolite beta.

The total catalytic coating loading of three layers was about 4.4 g/in$^3$ with a total PGM loading of 52 g/ft$^3$ and a Pt/Pd ratio of 2/1.

Inventive Coating 1: Two-Layer Catalytic Coating Composition

A bottom coat was prepared comprising Pd and Ce on chabazite. A Pd-nitrate/magnesium nitrate solution was prepared having a Pd/Mg mole ratio of 1/1. A 20% Ce on chabazite powder as prepared in Example 1 was added to the solution to provide a slurry. After mixing well, alumina powder was added together with Mn-coated Ce powder (as described in U.S. app. No. PCT/US2016/016949 (WO2016130456)) and zeolite H$^+$-beta. A small amount of cerium acetate binder was added, providing a slurry having a solid concentration of about 34-38%, pH of 4.5-5.0 and viscosity about 1700 centipoise.

The washcoat slurry was applied to a honeycomb core to form a bottom coat. The core was dried at 120° C. for four hours and calcined at 500° C. for 1 hour to provide a coated core having a precious metal (Pd) loading of 20 g/ft$^3$ and a total bottom coat loading of 1.8 g/in$^3$ of which 0.6 g/in$^3$ was zeolite beta.

A top coat was prepared comprising Pt and Pd on alumina. Pt nitrate and Pd nitrate were mixed with de-ionized water. A rheology modifier polymer PVP (polyvinylpyrrolidone) was added and the liquid was mixed with silica-coated alumina (5 wt. % silica). The slurry was milled to provide a washcoat slurry having a particle size of a $D_{90}$ of from 15-20 microns. Alumina binder was added to provide a slurry having a viscosity from 400 to 600 centipoise and a solid concentration from 28 to 30%.

The washcoat slurry was applied to the coated honeycomb core. The coated core was dried at 120° C. for four hours and calcined at 500° C. for 1 hour. The top coating composition had a precious metal loading of 34 g/ft$^3$ with a Pt/Pd ratio of 32:2 and a coating loading of 1.0 g/in$^3$.

This total two-layer catalytic coating had a loading of 2.8 g/in$^3$, a PGM loading of 54 g/ft$^3$ with a Pt/Pd ratio of 32/22.

Example 3: Catalyst Performance

Figure 10:
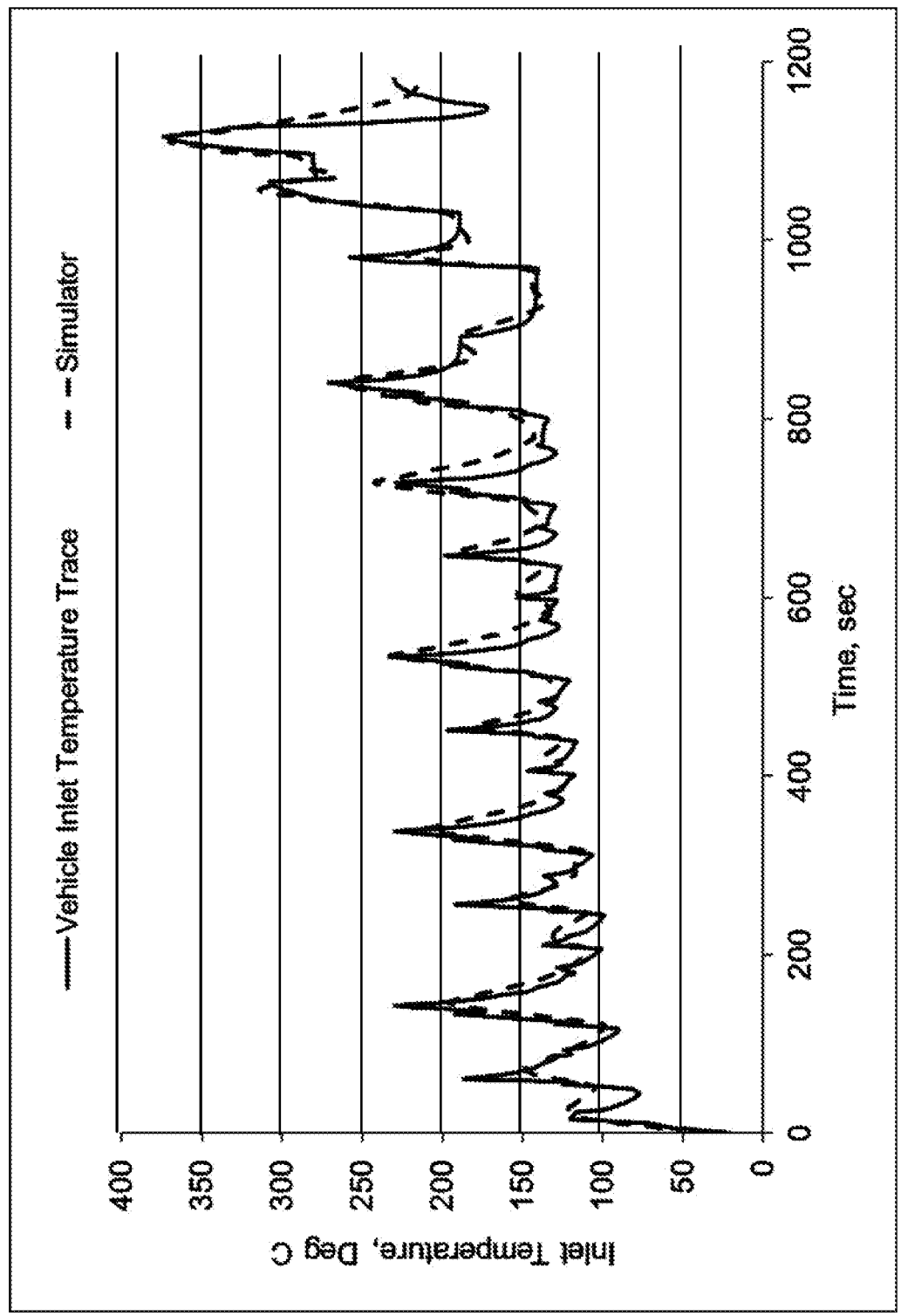
FIG. 10 shows a comparison of engine out temperature traces between vehicle and simulator.
Figure 11:
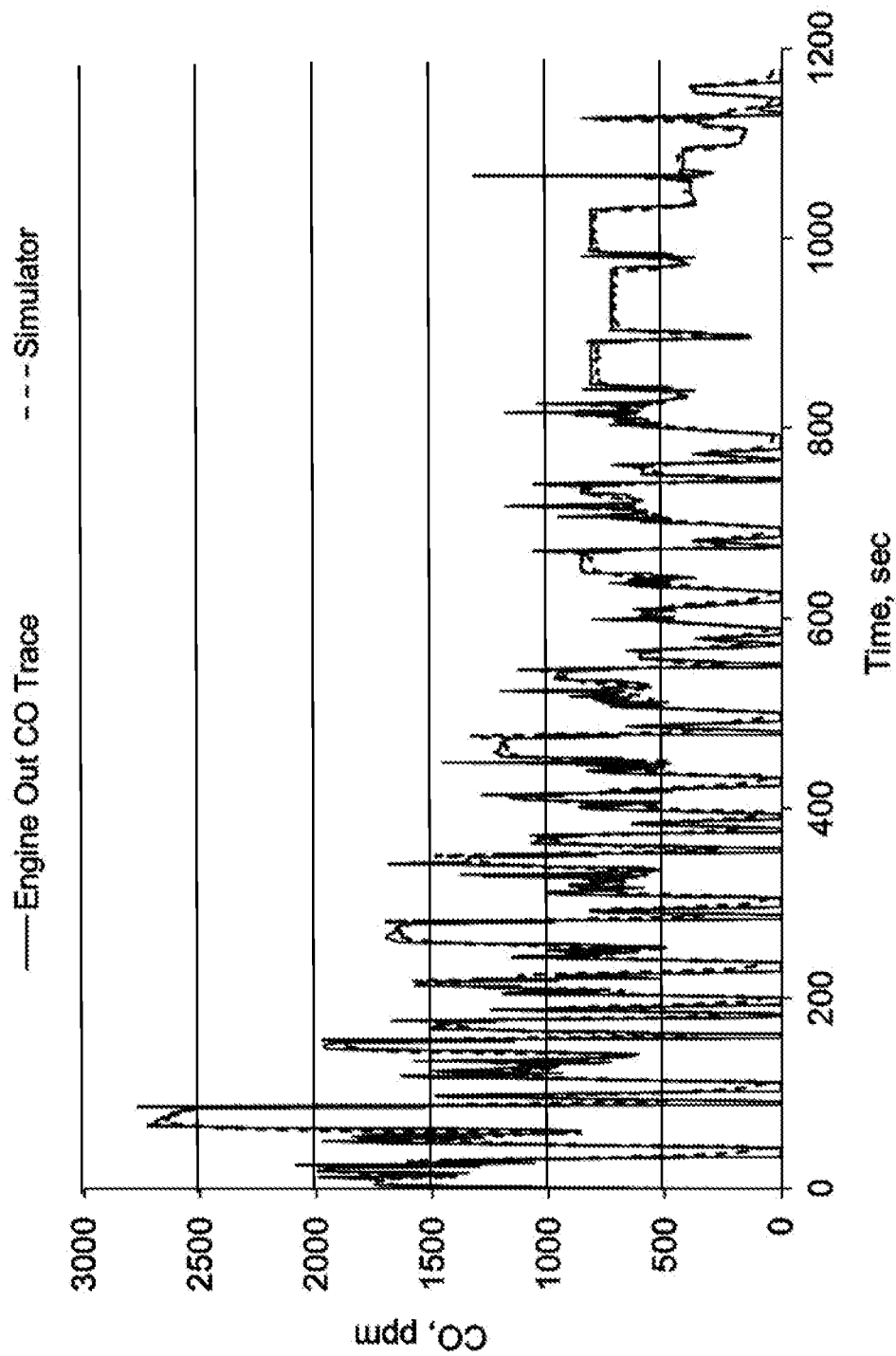
FIG. 11 shows a comparison of engine out CO emissions between the vehicle trace and simulator.

The coated core samples were evaluated in a simulated diesel vehicle exhaust gas reactor, under the dynamic NEDC (New European Driving Cycle) protocol, for both fresh and aged samples. The simulated exhaust gas flow conditions, along with the feed compositions for the NEDC cycle are shown in FIGS. 10 and 11. Aging was conducted in a tube furnace under a flow consisting of 10% steam/10% oxygen/balance nitrogen at 800° C. for 16 hours.

After aging, the non-Ce-containing comparative coating 1, Ce-containing comparative coating 2 and inventive coating 1 were evaluated in the Diesel Vehicle Simulator (DVS) under the NEDC protocol. Results below indicate that the inventive coating 1 exhibited the best overall performance regarding HC, CO and $NO_2/NOx$ conversion.

|  | HC conversion (%) | CO conversion (%) | $NO_2/NOx$ conversion (%) |
|---|---|---|---|
| Comparative Coating 1 | 71.5 | 56.2 | 28.3 |
| Comparative Coating 2 | 69.6 | 65.6 | 12.2 |
| Inventive Coating 1 | 76.6 | 70.0 | 26.0 |

Example 4: Engine Testing

A full size (5.66" diameter×3" length) 400 cpsi honeycomb having the inventive coating composition of inventive coating 1 was tested in an engine bench vs. comparative coating 2. Light-off testing was conducted after catalyst activation using the particle filter regeneration mode of the engine for 10 minutes (T inlet ~650° C., lean lambda). For CO and HC light-off testing, the feed gas contained: CO=1200 ppm; THC=150 ppm; NOx=50 ppm; mass flow 30-40 m$^3$/h; for $NO_2/NOx$ measurement, the feed gas had: CO 200-1000 ppm; THC 50 ppm; NOx 200-1000 ppm.

Sulfation (SOx) of the catalyst was performed on the engine bench at 300° C. via dosing 1000 ppm $SO_2$ for 2 minutes. Desulfation (deSOx) was performed using the particle filter regeneration mode of the engine (bed temperature of the catalyst ~650° C.). The sulfation/desulfation cycle was performed 5 times.

The light-off test after sulfation was similar to the above light-off test. The first light-off test runs were conducted without activation using the particle filter regeneration mode to evaluate the sulfated performance of the catalyst.

Engine bench testing results, shown below, indicate that the Pd/Ce/CHA-containing catalyst of inventive coating 1 exhibited superior sulfur resistance.

|  | aged | 5xSOx | 5xdeSOx |
|---|---|---|---|
|  | CO light-off $T_{50}$° C. | | |
| Comparative Coating 2 | 182 | 194 | 190 |
| Inventive Coating 1 | 206 | 212 | 209 |
|  | HC light-off $T_{70}$° C. | | |
| Comparative Coating 2 | 203 | 213 | 209 |
| Inventive Coating 1 | 225 | 229 | 225 |

What is claimed is:

1. A catalytic article comprising a catalytic coating disposed on a substrate, wherein the catalytic coating comprises a bottom coating layer on the substrate and a top coating layer on the bottom coating layer, wherein:
    the bottom coating layer comprises a ceria-containing molecular sieve, and the top coating layer comprises a platinum group metal on a refractory metal oxide support; or
    the bottom coating layer comprises a platinum group metal on a refractory metal oxide support, and the top coating layer comprises a ceria-containing molecular sieve;
    and wherein the ceria in the ceria-containing molecular sieve is present from 20% to about 50% by weight, based on a total weight of the ceria-containing molecular sieve.

2. The catalytic article of claim 1, wherein the ceria-containing molecular sieve is a small pore molecular sieve.

3. The catalytic article of claim 1, wherein the ceria-containing molecular sieve comprises a small pore molecular sieve with a framework type selected from ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, ZON, and mixtures or intergrowths thereof.

4. The catalytic article of claim 1, wherein the ceria-containing molecular sieve comprises a molecular sieve with a framework type selected from CHA, LEV, AEI, AFX, ERI, SFW, KFI, DDR, ITE, and mixtures or intergrowths thereof.

5. The catalytic article of claim 1, wherein the ceria-containing molecular sieve is CeCHA.

6. The catalytic article of claim 1, wherein the ceria-containing molecular sieve comprises a medium pore molecular sieve with a framework type selected from AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MWW, NAB, NAT, NES, OBW, PAR, PCR, PON, PUN, RRO, RSN, SFF, SFG, STF, STI, STT, STW, SVR, SZR, TER, TON, TUN, UOS, VSV, WEI, WEN, and mixtures or intergrowths thereof.

7. The catalytic article of claim 1, wherein the ceria-containing molecular sieve comprises a molecular sieve with a framework type selected from FER, MEL, MFI, STT, and mixtures or intergrowths thereof.

8. The catalytic article of claim 1, wherein the ceria-containing molecular sieve comprises a ZSM-5 molecular sieve.

9. The catalytic article of claim 1, wherein the ceria-containing molecular sieve is present in a loading of from about 0.05 $g/in^3$ to about 5.0 $g/in^3$, based on a total volume of the substrate.

10. The catalytic article of claim 1, wherein the bottom layer further comprises a hydrocarbon adsorption molecular sieve.

11. The catalytic article of claim 1, where the ceria-containing molecular sieve further comprises one or more catalytically active metals selected from copper, iron, manganese, magnesium, cobalt, nickel, platinum, palladium, and rhodium.

12. The catalytic article of claim 11, wherein the one or more catalytically active metals are present in a loading of about 3 $g/ft^3$ to about 100 $g/ft^3$, based on a total volume of the substrate.

13. The catalytic article of claim 1, wherein the refractory metal oxide support comprises alumina, titania, and/or zirconia.

14. The catalytic article of claim 1, wherein the platinum group metal is present in a loading of about 2 $g/ft^3$ to about 200 $g/ft^3$, based on a total volume of the substrate.

15. The catalytic article of claim 1, wherein the substrate is a porous wall-flow filter.

16. The catalytic article of claim 1, wherein the substrate is a flow-through monolith.

17. The catalytic article of claim 1, wherein the bottom coating layer is in direct contact with the substrate.

18. The catalytic article of claim 1, wherein the top coating layer is in direct contact with the bottom coating layer.

19. The catalytic article of claim 1, wherein the catalytic coating further comprises an undercoat layer.

20. The catalytic article of claim 1, wherein the catalytic coating further comprises an overcoat layer.

21. The catalytic article of claim 1, wherein the catalytic coating comprises an interlayer between the top and bottom coating layers.

22. The catalytic article of claim 1, wherein the catalytic coating further comprises an undercoat layer, an overcoat layer or an interlayer, where one or more of the undercoat layer, the overcoat layer, and the interlayer are substantially free of platinum group metal components.

23. The catalytic article of claim 1, wherein the catalytic coating is present at a loading of about 0.3 $g/in^3$ to about 7 $g/in^3$, based on a total volume of the substrate.

24. The catalytic article of claim 1, wherein the top coating layer overlays the entire bottom coating layer.

25. The catalytic article of claim 1, wherein the bottom coating layer extends the entire axial length of the substrate.

26. The catalytic article of claim 1, wherein the top coating layer extends the entire axial length of the substrate.

27. The catalytic article of claim 1, wherein the bottom coating layer extends from about 10% to about 95% of the axial length of the substrate, from either an inlet or outlet end.

28. The catalytic article of claim 1, wherein the top coating layer extends from about 10% to about 95% of the axial length of the substrate, from either an inlet or outlet end.

29. An exhaust gas treatment system comprising the catalytic article of claim 1, positioned downstream of and in fluid communication with an internal combustion engine.

30. The exhaust gas treatment system of claim 29, further comprising a catalytic article selected from a urea injector, a selective catalytic reduction catalyst, a diesel oxidation catalyst, a soot filter, an ammonia oxidation catalyst, and a lean NOx trap.

31. A method for treating an exhaust gas stream comprising hydrocarbons and/or carbon monoxide and/or NOx, the method comprising passing the exhaust stream through the catalytic article of claim 1.

32. The catalytic article of claim 13, wherein the refractory metal oxide support comprises a mixture of alumina with one or more of titania, zirconia and ceria; ceria coated on alumina; titania coated on alumina; silica-alumina; aluminosilicates; alumina-zirconia; alumina-chromia; or alumina-ceria.

* * * * *